(12) United States Patent
Friedrich et al.

(10) Patent No.: US 11,089,167 B2
(45) Date of Patent: Aug. 10, 2021

(54) APPARATUS, SYSTEM AND METHOD OF INTERNET CONNECTIVITY VIA A RELAY STATION

(71) Applicant: Apple Inc., Cupertino, CA (US)

(72) Inventors: Ari Friedrich, Ramat Gan (IL); Roni Abiri, Raanana (IL); Segev Ravgad, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 16/305,190

(22) PCT Filed: Jun. 30, 2016

(86) PCT No.: PCT/US2016/040326
§ 371 (c)(1),
(2) Date: Nov. 28, 2018

(87) PCT Pub. No.: WO2018/004589
PCT Pub. Date: Jan. 4, 2018

(65) Prior Publication Data
US 2020/0322486 A1 Oct. 8, 2020

(51) Int. Cl.
*H04M 15/00* (2006.01)
*H04W 28/08* (2009.01)
(Continued)

(52) U.S. Cl.
CPC ...... *H04M 15/854* (2013.01); *H04L 12/1475* (2013.01); *H04M 15/58* (2013.01);
(Continued)

(58) Field of Classification Search
CPC .... H04M 17/10; H04M 15/00; H04M 15/854; H04M 15/93; H04M 15/58;
(Continued)

(56) References Cited

U.S. PATENT DOCUMENTS

2003/0046231 A1* 3/2003 Wu .................................. 705/43
2006/0161479 A1* 7/2006 Nashed ........................... 705/14
(Continued)

OTHER PUBLICATIONS

International Search Report and the Written Opinion for International Application No. PCT/US2016/040326, dated Mar. 8, 2017, 10 pages.
(Continued)

*Primary Examiner* — Meless N Zewdu
(74) *Attorney, Agent, or Firm* — Sterne, Kessler, Goldstein & Fox P.L.L.C.

(57) ABSTRACT

Some demonstrative embodiments include apparatuses, systems and/or methods of establishing an Internet connection. For example, a server may perform operations including storing relay account information corresponding to at least one relay station to provide Internet access, and client account information of at least one client, the client account information comprising credit information indicating a credit balance of the client; processing a connection request received from a wireless station via the relay station, the connection request to request an Internet connection via the relay station, the connection request comprising a client identifier of the client; sending to the wireless station via the relay station connection establishment information to establish the Internet connection via the relay station; and updating the credit balance based on usage information from the relay station, the usage information indicating a usage of the Internet connection by the wireless station.

25 Claims, 11 Drawing Sheets

(51) Int. Cl.
  *H04L 12/14* (2006.01)
  *H04W 4/24* (2018.01)
  *H04W 12/06* (2021.01)

(52) U.S. Cl.
  CPC ....... *H04M 15/8083* (2013.01); *H04M 15/93* (2013.01); *H04W 4/24* (2013.01); *H04W 12/06* (2013.01); *H04W 28/0967* (2020.05)

(58) Field of Classification Search
  CPC .. H04M 15/8083; H04M 15/56; H04M 15/72; H04M 15/721; H04M 15/723; H04M 15/73; H04M 15/735; H04M 15/753; H04M 15/755; H04M 17/208; H04M 2017/22; H04M 2017/24; H04M 2017/248; H04M 2215/0176; H04M 2215/018; H04M 2215/0184; H04M 2215/7018; H04M 15/15; H04M 15/61; H04W 40/22; H04W 40/24; H04W 40/04; H04W 88/06; H04W 4/24; H04W 12/06; H04W 40/246; H04W 28/08; H04W 4/30; H04W 28/0967; H04W 4/33; H04W 4/35; H04W 4/38; H04W 4/40; H04W 4/50; H04W 4/60; H04W 4/80; H04W 4/70; H04W 88/00; H04W 88/02; H04W 88/08; H04W 28/0835; H04W 28/0838; H04W 28/0831; H04W 72/00; H04W 72/04; H04W 72/0406; H04W 72/042; H04W 72/0493; H04W 72/06; H04W 80/00; H04W 80/02; H04W 80/04; H04W 80/045; H04W 88/04; H04W 88/10; H04W 88/16; H04W 88/18; H04W 92/00; H04W 92/02; H04W 92/04; H04W 92/08; H04W 92/10; H04W 4/00; H04W 28/0819; H04W 40/38; H04W 28/0815; H04L 12/14; H04L 12/1475; H04L 12/283; H04L 12/2834; H04L 12/4625; H04L 12/2856; H04L 12/1403; H04L 12/141; H04L 29/08522; H04L 29/08531; H04L 29/12566; H04L 29/12575; G06Q 20/30; G06Q 20/306; G06Q 20/308; G06Q 20/321; G06Q 20/32; G06Q 20/00
  See application file for complete search history.

(56) References Cited

U.S. PATENT DOCUMENTS

| | | |
|---|---|---|
| 2007/0240202 A1* | 10/2007 | Sulivan et al. ................. 726/4 |
| 2010/0150120 A1* | 6/2010 | Schlicht et al. ............. 370/338 |
| 2013/0254032 A1* | 9/2013 | Mandke etal. ........ G06K 20/204 |
| 2014/0106705 A1* | 4/2014 | Burchman et al. ... H04M 17/10 |
| 2014/0369232 A1 | 12/2014 | Kim et al. |
| 2015/0178721 A1* | 6/2015 | Pandiarajan et al. ........................ G06Q 20/382 |
| 2016/0028665 A1* | 1/2016 | Yan et al. ............. H04L 51/046 |
| 2017/0187888 A1* | 6/2017 | Shukla et al. .... H04M 15/8214 |
| 2017/0195867 A1* | 7/2017 | Kim et al. ............ H04W 8/005 |
| 2017/0222822 A1* | 8/2017 | Lopez Quirarte .. H04L 12/1457 |
| 2018/0184281 A1* | 6/2018 | Tamagawa ............ H04W 8/183 |

OTHER PUBLICATIONS

Klaas Wierenga: "IEEE 802.11u Overview", XP055349133, Retrieved from the Internet: URL:https://www.terena.org/activities/tf-mobility/meetings/19/ wierenga-802.11 u.pdf [retrieved on Feb. 23, 2017] ; May 7, 2009, 10 pages.

International Preliminary Report on Patentability for International Application No. PCT/US2016/040326, dated Jan. 10, 2019, 9 pages.

* cited by examiner

US 11,089,167 B2

APPARATUS, SYSTEM AND METHOD OF INTERNET CONNECTIVITY VIA A RELAY STATION

TECHNICAL FIELD

Embodiments described herein generally relate to Internet connectivity via a relay station.

BACKGROUND

A user may consider access to the Internet as a basic functionality of a mobile device.

In some cases, the access to the Internet may not be available and/or may be too expensive, for example, for tourists, roamers, and/or devices, which do not have a cellular modem, e.g., tablets and/or the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
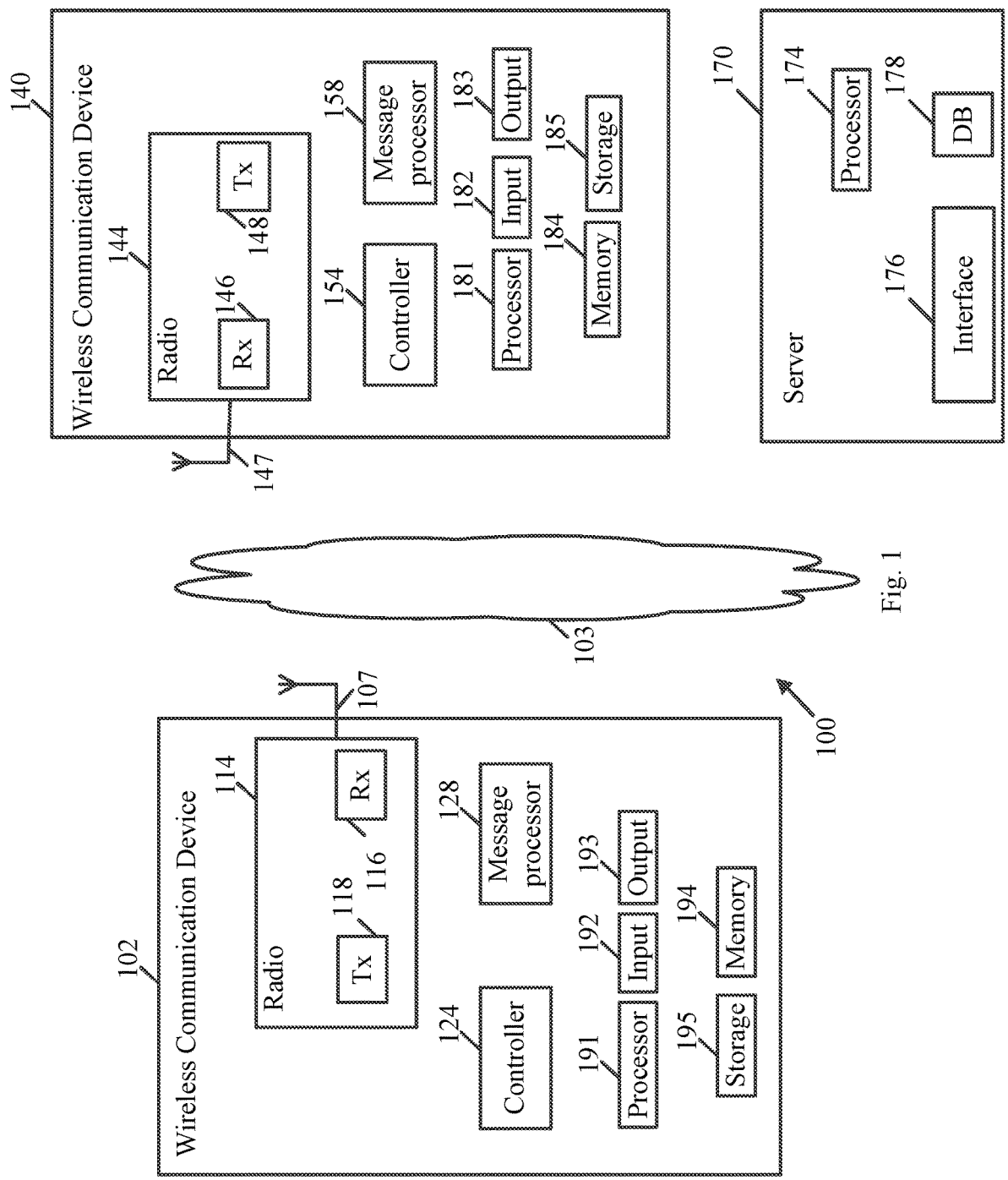
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc, indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc, to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing WiFi Alliance (WFA) Specifications (including *Wi-Fi Neighbor Awareness Networking (NAN) Technical Specification, Version* 1.0, *May* 1, 2015) and/or future versions and/or derivatives thereof, devices and/or networks operating in accordance with existing WFA Peer-to-Peer (P2P) specifications (*including WiFi P2P technical specification, version* 1.5, *Aug.* 4, 2014) and/or future versions and/or derivatives thereof, devices and/or networks operating in accordance with existing IEEE 802.11 standards (including *IEEE* 802.11-2012, *IEEE Standard for Information technology—Telecommunications and information exchange* between systems Local and metropolitan area networks—Specific requirements Part 11: Wireless LAN Medium Access Control (MAC) and Physical Layer (PHY) Specifications, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 December, 2012); and/or IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing Wireless-Gigabit-Alliance (WGA) specifications (*including Wireless Gigabit Alliance, Inc WiGig MAC and PHY Specification Version 1.1, April 2011, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, for example, including at least one wireless device 102, and/or at least one wireless device 140.

In some demonstrative embodiments, wireless communication devices 102 and/or 140 may include, for example, a User Equipment (UE), a Mobile Device (MD), a wireless station (STA), an Access Point (AP), a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more Bluetooth (BT) devices.

In some demonstrative embodiments, devices 102 and/or 140 may include, operate as, and/or perform the functionality of one or more Neighbor Awareness Networking (NAN) STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102 and/or 140 may include, operate as, and/or perform the functionality of any other devices and/or STAs.

In some demonstrative embodiments, system 100 may include a device, e.g., device 140, which may be configured to operate as, and/or to perform the functionality of, an access point (AP) STA.

In some demonstrative embodiments, devices 102 and/or 140 may be configured to operate as, and/or to perform the functionality of, a non-AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, device 140 may be configured to operate as, and/or to perform the functionality of an AP STA, and/or device 102 may be configured to operate as, and/or to perform the functionality of a non-AP STA.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components.

In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102 and/or 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, BT band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, and/or may communicate as part of, a wireless local area network (WLAN).

In some demonstrative embodiments, a user of device 102 may require an Internet connection, for example, to access the Internet.

In some demonstrative embodiments, device 102 may not be able to provide Internet connectivity, for example, if an Internet connection is not available, and/or if the Internet connection is too expensive.

In one example, device 102 may not have a cellular modem to provide an Internet connection to the user of device 102, e.g., if device 102 includes a Tablet or any other device not configured to provide cellular connectivity. According to this example, the user of device 102 may be required to search for a free WiFi hot spot and/or to search for hotspots, which require payment.

In another example, the user of device 102 may be visiting another country, in which usage of a cellular modem of device 102, e.g., using a local carrier, may be expensive and/or unavailable. According to this example, the user may be required to pay for Internet access via the local carrier and/or to search for WiFi hotspots.

In some demonstrative embodiments, device 140 may have access to the Internet. For example, device 140 may have a direct Internet connection, and/or may have cellular Internet connectivity, e.g., via a local carrier.

Some demonstrative embodiments may enable a device, e.g., device 140, which has Internet access, to operate as, and/or perform a role of a relay device to share the Internet access with a client device, e.g., device 102, which does not have access to the Internet, e.g., via local mobile Internet plan.

For example, a relay device may include a local cellular phone having cellular Internet connectivity, e.g., provided by a local carrier; and/or the client device may include a cellular device carried by a tourist, which does not have the cellular Internet connectivity.

In some demonstrative embodiments, devices 102 and 140 may implement Internet connectivity scheme to allow a peer-to-peer (P2P) metered sharing of access to the Internet, e.g., as described below.

In some demonstrative embodiments, the Internet connectivity scheme may provide a financial incentive to a user of the relay device to share the Internet connectivity with client devices.

In some demonstrative embodiments, the Internet connectivity scheme may enable, for example, "On-the-Go" Internet access for client devices, which do not have cellular Internet connectivity, e.g., as described below.

In some demonstrative embodiments, using manual setting of tethering between a relay device and a client device, e.g., with no control of data consumption by the client device and/or without the financial incentive to the user of the relay device, may not be effective.

In some demonstrative embodiments, using the manual setting of tethering between the relay device and the client device may be cumbersome, for example, as it may require an exchange of a password between the relay device and the client device, and/or it may require the relay device to change its password for any new connection with a client device.

In some demonstrative embodiments, the Internet connectivity scheme may enable the client device to access the Internet via the relay device, e.g., seamlessly, for example, even without a need for the relay device to be identified, for example, by allowing the relay device to remain anonymous, e.g., as described below.

In some demonstrative embodiments, the Internet connectivity scheme may be configured, for example, to allow the relay device to enable the client device to securely access the Internet using the Internet connectivity of the relay device, for example, while allowing the user of the relay device to get paid for sharing its Internet connectivity with the client device, e.g., as described below.

In some demonstrative embodiments, the Internet connectivity scheme may enable a fully automated process to provide the Internet connectivity to the client device via the relay device, e.g., as described below.

In one example, when implementing the Internet connectivity scheme, there may be no need of the user of the client device and/or the user of the relay device to perform any manual activity, e.g., creating passwords, changing passwords, entering passwords, logging in, logging out, and/or the like, for example, in opposed to using Wi-Fi Protected Setup (WPS) or WPS 2.0 protocols, which make sharing an Internet connectivity cumbersome and/or hard to manage.

In some demonstrative embodiments, the Internet connectivity scheme may enable providing metered traffic, which may enable to charge for usage of the Internet connectivity, e.g., even using a flexible charging, for example, by providing different packages and/or enabling a varying charge, for example, based on a remaining quota, e.g. first 50 MB for 10 USD and any additional 50 MB for 1 USD.

In some demonstrative embodiments, the Internet connectivity scheme may enable providing an end to end (E-2-E) security of the Internet connectivity, for example, by not allowing the relay device to eavesdrop to the traffic of the client device, e.g., as described below.

In some demonstrative embodiments, the Internet connectivity scheme may enable the client device to select a best relay device from a plurality of relay devices, for example, in terms of one or more parameters, for example, a bit rate, a cost and/or the like, e.g., as described below.

In some demonstrative embodiments, the Internet connectivity scheme may support mobility of the client device between one relay device and another relay device, for example, in a seamless and/or user-friendly manner, e.g., as described below.

In some demonstrative embodiments, the Internet connectivity scheme may be suitable for implementation using digital currencies, e.g., Bitcoin or other block-chain currencies, as these currencies are better optimized for small amount low commission transactions, e.g., as described below.

In some demonstrative embodiments, the Internet connectivity scheme may enable a client device to discover a relay device, for example, using low power technologies, e.g., a NAN technology, a BLE technology and/or the like.

In some demonstrative embodiments, the low power technologies may enable the client device to discover the relay device, e.g., at any time, for example, while enabling the relay device to use WiFi functionality at the same time.

In some demonstrative embodiments, system 100 may include a server 170 configured to manage one or more operations and/or functionalities of the Internet connectivity scheme, e.g., as described below.

In some demonstrative embodiments, server 170 may be configured to authenticate the client device, to authenticate the relay device, and/or to assure that the user of the relay device receives payment for sharing its Internet connection, e.g., as described below.

In some demonstrative embodiments, server 170 may include, operate as, and/or perform one or more functionalities of, a remote server, a web-based server, a cloud server, and/or any other server.

In some demonstrative embodiments, server 170 may include at least one processor 174, which may be configured to execute instructions to perform one or more functionalities, operations and/or procedures to manage the Internet connectivity scheme, e.g., as described below.

In some demonstrative embodiments, server 170 may include a communication interface 176 to interface between server 170 and devices 102 and/or 140, e.g., via one or more wired and/or wireless communication networks.

In some demonstrative embodiments, communication interface 176 may be implemented using any suitable hardware components and/or software components, for example, processors, controllers, memory units, storage units, input units, output units, communication units, operating systems, and/or applications.

In some demonstrative embodiments, communication interface 176 may include a wireless communication interface and/or a wired communication interface.

In some demonstrative embodiments, communication interface 176 may be associated with and/or may include, for example, a gateway (GW) and/or an application programming interface (API), for example, to communicate information and/or communications between elements of system 100 and/or to one or more other, e.g., internal or external, parties, users, applications and/or systems.

In some demonstrative embodiments, device 102 may be configured to allow the user of device 102 to register at server 170, for example, to enable device 102 to connect to the Internet via a relay device.

In some demonstrative embodiments, a user of device 102, e.g., a client, may set an agreement with server 170, for making payments on the user's behalf. In one example, the agreement may include one or more constraints, e.g., a duration of preapproval of the payment, a maximum amount of payment being preapproved, and/or the like.

In some demonstrative embodiments, device 140 may be configured to allow a user of device 140 to register at server 170, for example, to enable device 140 to provide Internet access to client devices, and to allow the user of device 140 to receive payment for providing the Internet access.

In some demonstrative embodiments, during the registration process the client device may be connected to a Wi-Fi network, for example, to connect to server 170, e.g., via communication interface 176.

In some demonstrative embodiments, the relay device, e.g., device 140, may advertize that the relay device is able to provide Internet access to client devices.

In some demonstrative embodiments, the advertisement may utilize a low power communication advertisement mechanism, e.g., utilizing BLE communication and/or Wi-Fi aware communication, for example, to enable the relay device to use a WiFi communication, e.g., while advertising.

In some demonstrative embodiments, the client device, e.g., device 102, may discover the relay device, e.g., to allow the client device to receive the Internet access via the relay device.

In some demonstrative embodiments, the client device may request the server 170 to receive the Internet access via the relay device.

In some demonstrative embodiments, the relay device and/or the client device may be configured to connect to server 170, for example, via a secure connection, e.g., utilizing an encrypted Quick User Datagram Protocol (UDP) Internet Connection (QUIC), or any other connection.

In some demonstrative embodiments, the client device, e.g., device 102, may connect to the relay device to receive the Internet access via the relay device, e.g., if the server authenticates and approves the request of the client device.

In some demonstrative embodiments, the client device may discover the relay device based on the BLE communication and/or the Wi-Fi aware communication.

In some demonstrative embodiments, the client device may switch from the BLE communication and/or the Wi-Fi aware communication to a Wi-Fi communication, e.g., seamlessly, for example, to communicate data from the Internet via the relay device.

In some demonstrative embodiments, a relay device, e.g., device 140, may be configured to be able to serve a plurality of client devices, e.g., including device 102.

In some demonstrative embodiments, a plurality of client devices, which may be served by the same relay device, may be identified, for example, based on an IP address of the relay device.

In some demonstrative embodiments, server 170 may instruct a relay device, e.g., device 140, to operate as an AP, e.g., a software enabled AP (SoftAP), for example, using a Wi-Fi Protected Access (WPA) and/or a WPA 2 protocol, for example, to provide Internet access to a client device, e.g., device 102.

In some demonstrative embodiments, the relay device, e.g., device 140, may share a cellular Internet connectivity with the client device, for example, using a Network Access Technology (NAT), and/or any other technology.

In some demonstrative embodiments, the relay device, e.g., device 140, may be configured to meter the usage of the Internet connection by the client device, and to report the usage to server 170, e.g., as described below.

In some demonstrative embodiments, server 170 may be configured to approve, to grant, and/or to terminate the Internet connection via the relay device, for example, based on one or more criteria corresponding to the relay device and/or the client device, e.g., a credit balance, a bitrate, a user authorization, and/or the like, e.g., as described below.

Figure 2:
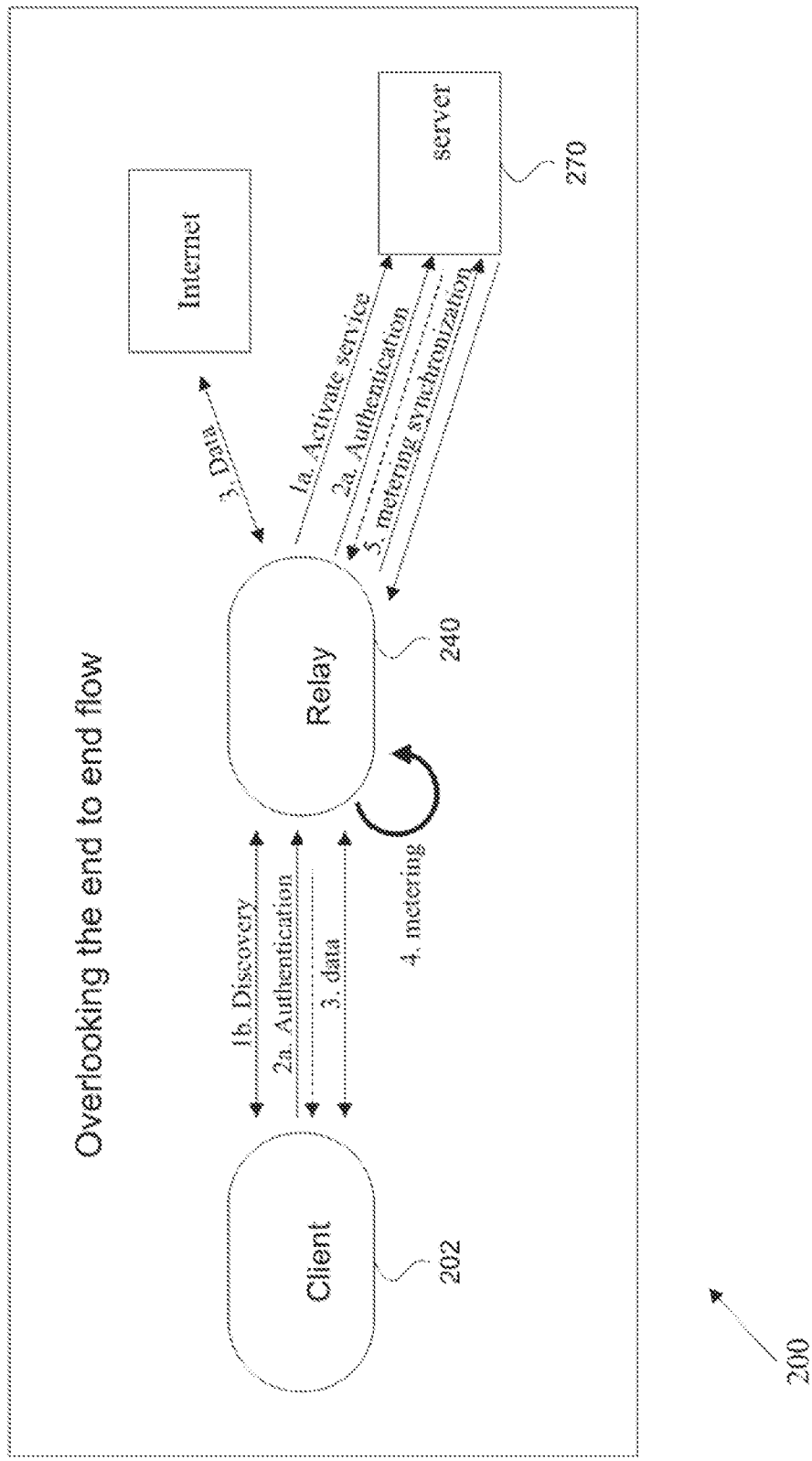
FIG. 2 is a schematic illustration of operations and communications between elements of a system, in accordance with some demonstrative embodiments.

Reference is made to FIG. 2, which schematically illustrates operations and communications between elements of a system 200, in accordance with some demonstrative embodiments. For example, one or more elements of system 200 may operate as, perform a role of, and/or perform one or more functionalities of one or more elements of system 100 (FIG. 1).

In some demonstrative embodiments, as shown in FIG. 2, system 200 may include a server 270, a client device 202, and relay device 240. For example, server 170 (FIG. 1) may operate as, perform a role of, and/or perform one or more functionalities of server 270, device 102 (FIG. 1) may operate as, perform a role of, and/or perform one or more functionalities of client device 202, and/or device 140 (FIG. 1) may operate as, perform a role of, and/or perform one or more functionalities of relay device 240.

In some demonstrative embodiments, as indicated by arrow 1a, relay device 240 may register at server 270, for example, to enable relay device 240 to share an Internet connection with one or more client devices, e.g., client device 202.

In some demonstrative embodiments, as indicated by arrow 1b, client device 202 may discover relay device 240, for example, to connect to the Internet via the relay device 240.

In some demonstrative embodiments, as indicated by arrows 2a, server 270 may authenticate client device 202, e.g., using communications via relay device 240, and server 270 may approve client device 202 to connect to the Internet via the relay device 240, e.g., if the authentication is successful.

In some demonstrative embodiments, as indicated by arrows 3, relay device 240 may share the Internet connection with client device 202, and client device 202 may exchange data with the Internet via the relay device 240.

In some demonstrative embodiments, as indicated by arrow 4, relay device 240 may meter the usage of the Internet connection by the client device 202.

In some demonstrative embodiments, as indicated by arrow 5, relay device 240 may report the usage of the Internet connection by the client device 202 to server 270.

Referring back to FIG. 1, In some demonstrative embodiments, server 170 may be configured to manage an Internet connection of device 102, e.g., the client device 202 (FIG. 2), via device 140, e.g., the relay device 240 (FIG. 2), for example, as described below.

In some demonstrative embodiments, server 170 may be configured to store relay account information corresponding to at least one relay device to provide Internet access.

In some demonstrative embodiments, the relay account information may include relay credit information indicating a relay credit balance of device 140.

In some demonstrative embodiments, the relay account information of device 140 may include Internet connection capability information of device 140.

In some demonstrative embodiments, the Internet connection capability information of device 140 may include an indication of one or more attributes relating to a capability of device 140 to provide one or more relay services, for example, a maximal bandwidth providable by device 140, and/or an availability of device 140 to provide Internet access, e.g., to client devices.

In some demonstrative embodiments, the relay account information of device 140 may include authentication information corresponding to a user of device 140.

In some demonstrative embodiments, the relay account information of device 140 may include relay payment account information, for example, to facilitate payment to device 140 for a usage of the Internet connection by client devices.

In some demonstrative embodiments, server 170 may be configured to store client account information of at least one client, e.g., a user of device 102.

In some demonstrative embodiments, the client account information may include client credit information indicating a credit balance of the client.

In some demonstrative embodiments, the client account information corresponding to a client may include authentication information corresponding to the client.

In some demonstrative embodiments, the client account information corresponding to the client may include data plan information indicating a data plan for the Internet connection, e.g., as described below.

In some demonstrative embodiments, the data plan may include one or more parameters and/or attributes of a usage of an Internet connection, for example, at least a time of usage of the Internet connection, an amount of data to be provided to the client, and/or a quality of service (QoS) to be provided to the client. The data plan may include any other additional or alternative attributes and/or parameters.

In some demonstrative embodiments, server 170 may include a database 178 configured to store the client account information and/or the relay account information.

In some demonstrative embodiments, server 170 may be configured to receive a client registration request from the client of device 102, e.g., from device 102.

In some demonstrative embodiments, server 170 may be configured to store the client account information corresponding to the client in database 178, for example, based on the client registration request.

In some demonstrative embodiments, the client registration request may include the authentication information corresponding to the client.

In some demonstrative embodiments, server 170 may be configured to receive client payment information from the client of device 102, for example, to facilitate payment for the usage of the Internet connection by device 102.

In some demonstrative embodiments, server 170 may be configured to update the credit balance in the client account information, for example, based on the client payment information.

In some demonstrative embodiments, the client payment information may include the data plan information corresponding to the client.

In some demonstrative embodiments, server 170 may be configured to update the data plan information in the client account information, for example, based on the payment information.

In some demonstrative embodiments, server 170 may be configured to update the credit balance, for example, based on the data plan.

In some demonstrative embodiments, server 170 may be configured to receive a relay registration request from a user of device 140, e.g., from device 140.

In some demonstrative embodiments, server 170 may be configured to store relay account information corresponding to device 140 in database 178, for example, based on the relay registration request.

In some demonstrative embodiments, the relay registration request may include the authentication information corresponding to device 140.

In some demonstrative embodiments, the relay registration request may include the Internet connection capability information of device 140.

In some demonstrative embodiments, server 170 may be configured to process a connection request received from device 102 via device 140.

In some demonstrative embodiments, the connection request may indicate a request for providing an Internet connection to device 102 via device 140.

In some demonstrative embodiments, the connection request may include a client identifier of the client of device 102.

In some demonstrative embodiments, server 170 may be configured to authenticate the client of device 102, for example, based on the connection request, e.g., using the client identifier of the client of device 102 to access the authentication information, which may be included in the client account information stored in database 178.

In some demonstrative embodiments, server 170 may be configured to send to device 140 a grant message indicating the device 102 is allowed to establish the Internet connection via device 140, for example, if authentication of the client of device 102 is successful.

In some demonstrative embodiments, server 170 may be configured to send to device 102, e.g., via device 140, connection establishment information to establish the Internet connection via device 140.

In some demonstrative embodiments, the connection establishment information may include, for example, a Service Set Identifier (SSID), and a password corresponding to the SSID. In other embodiments, the connection establishment information may include any additional or alternative information to facilitate the Internet connection via device 140.

In some demonstrative embodiments, device 140 may be configured to send usage information to server 170 indicating a usage of the Internet connection by device 102.

In some demonstrative embodiments, the usage information may include, for example, at least time information corresponding to a usage time of the Internet connection by device 102, bandwidth usage information corresponding to a bandwidth of the Internet connection, data usage information corresponding to data usage by device 102 of the Internet connection, and/or any other additional or alternative information corresponding to usage of the Internet connection by device 102.

In some demonstrative embodiments, server 170 may be configured to update the credit balance of the client of device 102, for example, based on the usage information from device 140. For example, server 170 may reduce a remaining credit balance of the client of device 102 based on the usage of the Internet connection by device 102.

In some demonstrative embodiments, server 170 may be configured to update the credit balance of device 140, for example, based on the usage information of device 102. For example, server 170 may increase an accumulated credit balance of the device 140 based on the usage of the Internet connection by device 102.

In some demonstrative embodiments, server 170 may be configured to send a termination message to device 140 to terminate the Internet connection of device 102, for example, based on at least one termination criterion corresponding to the credit balance of the client of device 102.

In one example, the termination criterion may include, for example, whether or not the credit balance is below a predefined credit threshold.

Additionally or alternatively, the termination criterion may include, for example, any other criteria with respect to the credit balance, the usage of the Internet connection, or any other parameter.

In some demonstrative embodiments, device 102 may be configured to discover device 140 and/or to request server 170 to establish the Internet connection via device 140, e.g., as described below.

In some demonstrative embodiments, device 102 may be configured to allow the user of device 102 to register at server 170, for example, to enable device 102 to establish the Internet connection via device 140.

In some demonstrative embodiments, controller 124 may be configured to control, cause and/or trigger device 102 to send the client registration request to the server 170.

In some demonstrative embodiments, controller 124 may be configured to control, cause and/or trigger device 102 to receive and process the client identifier from the server 170, for example, in response to the client registration request.

In some demonstrative embodiments, controller 124 may be configured to control, cause and/or trigger device 102 to send the payment information to server 170, for example, to facilitate payment for usage of the Internet connection by device 102.

In some demonstrative embodiments, controller 124 may be configured to control, cause and/or trigger device 102 to discover a relay device, e.g., device 140, capable of providing Internet access.

In some demonstrative embodiments, controller 124 may be configured to control, cause and/or trigger device 102 to discover device 140 over a Bluetooth Low Energy (BLE) network or a WiFi aware network, for example, to enable device 102 to discover device 140, when WiFi communication is not available.

In some demonstrative embodiments, controller 124 may be configured to control, cause and/or trigger device 102 to send the connection request to the server 170, e.g., via device 140, to request to establish the Internet connection via device 140.

In some demonstrative embodiments, the connection request may include the client identifier corresponding to the client account information of device 102, e.g., in database 178

In some demonstrative embodiments, controller 124 may be configured to control, cause and/or trigger device 102 to receive the connection establishment information, e.g., including the SSID and the password, from server 170, e.g., via device 140.

In some demonstrative embodiments, controller 124 may be configured to control, cause and/or trigger device 102 to establish the Internet connection via device 140, for example, based on the connection establishment information received from server 170 via device 140.

In some demonstrative embodiments, controller 124 may be configured to control, cause and/or trigger device 102 to establish the Internet connection with device 140, for example, over a WiFi network.

In some demonstrative embodiments, device 102 may discover device 140, for example, based on a beacon frame from device 140.

In some demonstrative embodiments, controller 124 may be configured to control, cause and/or trigger device 102 to process a beacon frame from device 140.

In some demonstrative embodiments, the beacon frame may include the Internet connection capability information of device 140.

In some demonstrative embodiments, controller 124 may be configured to control, cause and/or trigger device 102 to establish the Internet connection via device 140, for example, based on the Internet connection capability information of device 140.

In some demonstrative embodiments, device 102 may be configured to select device 140 to establish the Internet connection from a plurality of detected relay devices, e.g., as described below.

In some demonstrative embodiments, device 102 may discover a plurality of relay devices configured to provide Internet access.

In some demonstrative embodiments, controller 124 may be configured to control, cause and/or trigger device 102 to select device 140 from the plurality of relay devices, for example, based on the Internet connection capability information of device 140, e.g., based on one or more relay selection criteria, which may relate to the relay capabilities of the relay devices.

In one example, device 102 may select device 140 from the plurality of relay devices, for example, if a maximal bandwidth providable by device 140 is greater than maximal bandwidths providable by the plurality of relay devices.

In some demonstrative embodiments, device 140 may be configured to at least provide the internet access to device 102, monitor the usage of the internet connection be device 102, and/or send the usage information to server 170, e.g., as described below.

In some demonstrative embodiments, device 140 may be configured to allow a user of device 140 to register at server 170, for example, to enable device 140 to provide the Internet access to client devices, e.g., device 102, and/or to receive payments for the usage of the Internet connection of device 140 by the client devices.

In some demonstrative embodiments, controller 154 may be configured to control, cause and/or trigger device 140 to send to server 170 a relay registration request, which may include, for example, the Internet connection capability information of device 140.

In some demonstrative embodiments, controller 154 may be configured to control, cause and/or trigger device 140 to send to server 170 payment information corresponding to device 140, for example, to facilitate the payment for the usage of the Internet connection of device 140 by device 102.

In some demonstrative embodiments, controller 154 may be configured to control, cause and/or trigger device 140 to process the Internet connection request from device 102 to request to establish the Internet connection via device 140.

In some demonstrative embodiments, controller 154 may be configured to control, cause and/or trigger device 140 to receive the Internet connection request over the BLE network and/or or the WiFi aware network.

In some demonstrative embodiments, controller 154 may be configured to control, cause and/or trigger device 140 to send the Internet connection request to the server 170.

In some demonstrative embodiments, controller 154 may be configured to control, cause and/or trigger device 140 to process the grant message from server 170 indicating whether or not device 102 is allowed to establish the Internet connection via device 140.

In some demonstrative embodiments, controller 154 may be configured to control, cause and/or trigger device 140 to establish the Internet connection with device 102, e.g., based on the grant message.

In some demonstrative embodiments, controller 154 may be configured to control, cause and/or trigger device 140 to establish the Internet connection with device 102, for example, over the WiFi network.

In some demonstrative embodiments, controller 154 may be configured to control, cause and/or trigger device 140 to send to server 170 the usage information indicating the usage of the Internet connection by device 102.

In some demonstrative embodiments, controller 154 may be configured to control, cause and/or trigger device 140 to terminate the Internet connection of device 102, for example, based on the termination message from server 170, e.g., as described above.

In some demonstrative embodiments, controller 154 may be configured to control, cause and/or trigger device 140 to send one or more frames, for example, a beacon frame and/or an advertisement frame, including the Internet connection capability information of device 140, for example, to enable a client device, e.g., device 102, to discover device 140, to advertize the Internet connection capabilities of device 140, and/or to enable device 102 to select between device 140 and one or more other relay devices, e.g., as described above.

Figure 3:
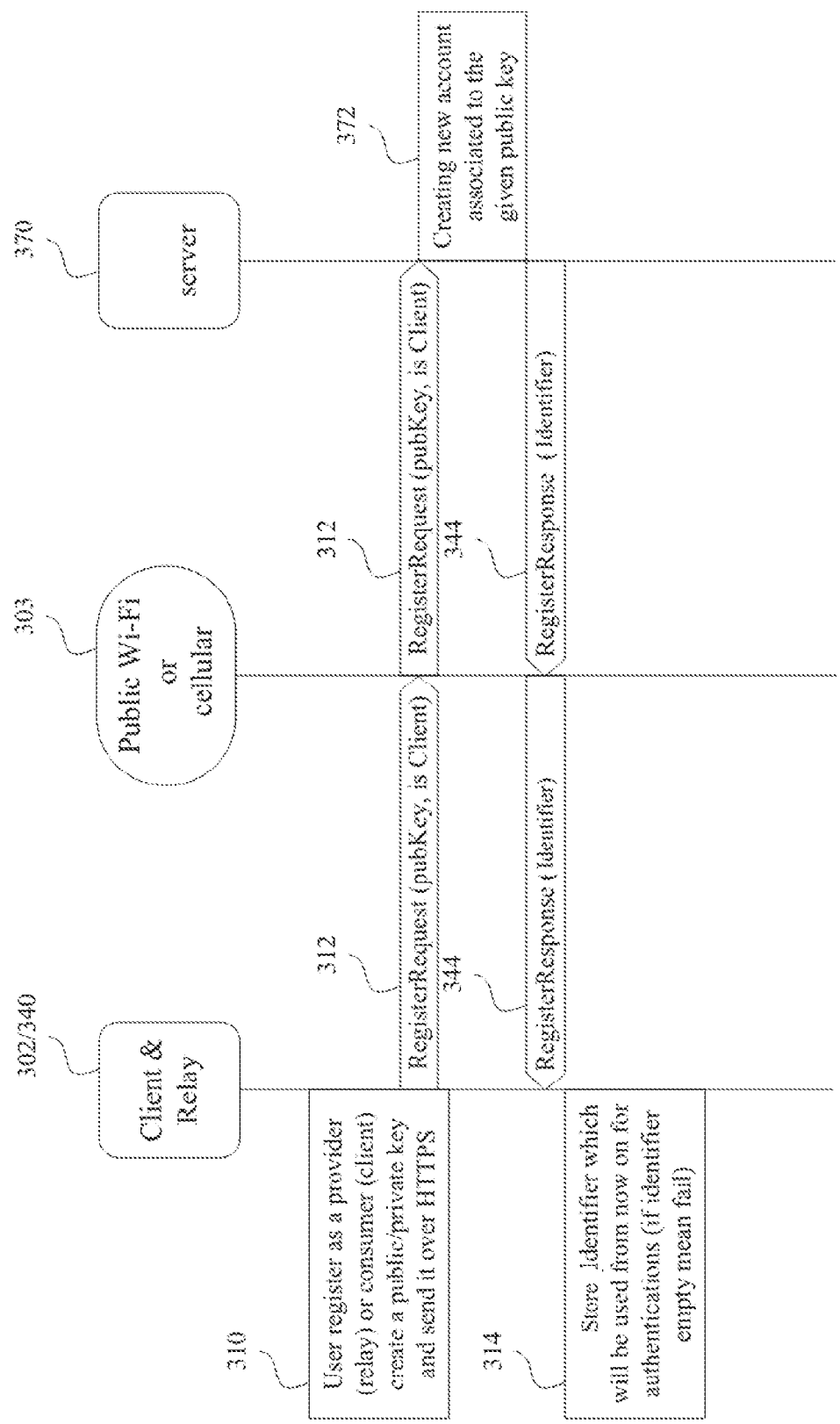
FIG. 3 is a schematic illustration of operations and communications according to a registration procedure, in accordance with some demonstrative embodiments.

Reference is made to FIG. 3, which schematically illustrates operations and communications according to a registration procedure 300, in accordance with some demonstrative embodiments.

In some demonstrative embodiments, as shown in FIG. 3, one or more operations of registration procedure 300 may be performed by a server 370, a client device 302, and/or a relay device 340 via a network 303, e.g., a cellular network and/or a Wi-Fi network. For example, server 170 (FIG. 1) may operate as, perform, a role of, and/or perform one or more functionalities of, server 370; device 102 (FIG. 1) may operate as, perform, a role of, and/or perform one or more functionalities of, client device 302; and/or device 140 (FIG. 1) may operate as, perform, a role of, and/or perform one or more functionalities of, relay device 340.

In some demonstrative embodiments, a user of client device 302 or relay device 340 may create (310) an authentication key corresponding to a user of the client device, e.g., a public private/key.

In some demonstrative embodiments, as indicated by arrows 312, the user of client device 302 or relay device 340 may send a registration request to the server 370, e.g., via network 303.

In some demonstrative embodiments, the registration request may optionally include the client payment information and/or the data plan, e.g., for client device 302.

In some demonstrative embodiments, the registration request may optionally include the relay payment information and/or the Internet connection capability information, e.g., for relay device 340.

In some demonstrative embodiments, the server 370 may create an account (372), e.g., a client account or a relay account, associated with the received client/relay authentication key.

In some demonstrative embodiments, as indicated by arrows 344, the server 370 may send an identifier to device 302 or relay device 340 to identify the account, e.g., via network 303.

In some demonstrative embodiments, client device 302 or relay device 340 may store the identifier to identify the account (314), for example, to be used to authenticate client device 302 or relay device 340 with server 370.

Figure 4:
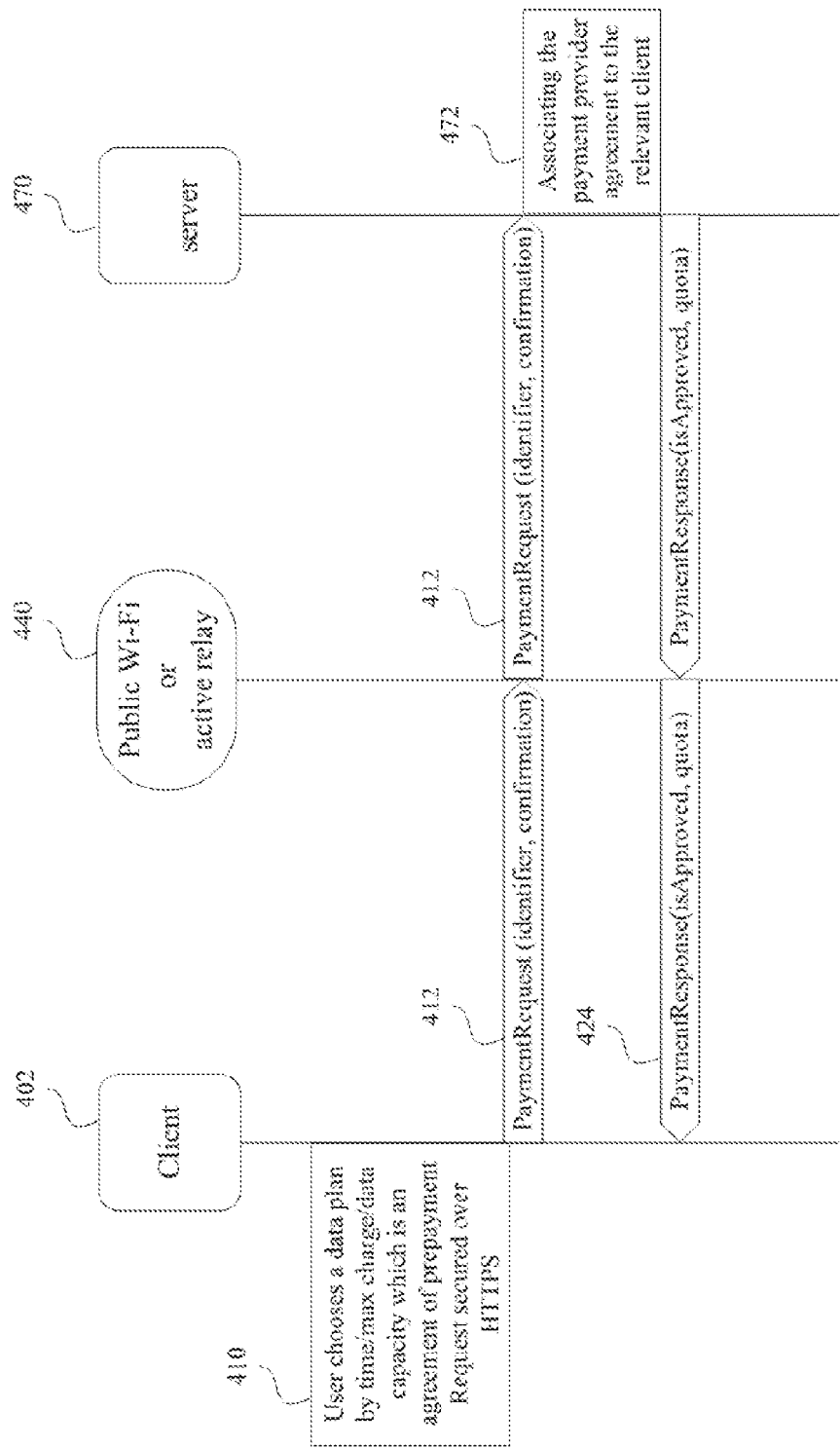
FIG. 4 is a schematic illustration of operations and communications according to a payment setup procedure, in accordance with some demonstrative embodiments.

Reference is made to FIG. 4, which schematically illustrates operations and communications according to a payment setup procedure 400, in accordance with some demonstrative embodiments.

In some demonstrative embodiments, as shown in FIG. 4, one or more operations of payment procedure 400 may be performed by a server 470, and a client device 402, via a network 403, e.g., a cellular network and/or a Wi-Fi network. For example, server 170 (FIG. 1) may operate as, perform, a role of, and/or perform one or more functionalities of, server 470; and/or device 102 (FIG. 1) may operate as, perform, a role of, and/or perform one or more functionalities of, client device 402.

In some demonstrative embodiments, a user of client device 402 may select a data plan (410), for example, according to a time of usage, an amount of data to be provided and/or the like, and/or a payment method, e.g., as described above.

In some demonstrative embodiments, as indicated by arrows 412, the client device 402 may send a payment request including the data plan and the payment information to the server 470, e.g., via network 403.

In some demonstrative embodiments, the server 470 may update the data plan and/or may associate the payment method with the client account (472), for example, based on the payment request.

In some demonstrative embodiments, as indicated by arrows 444, the server 470 may send a payment response to device 402, e.g., via network 403, for example, to acknowledge the payment request.

Figure 5:
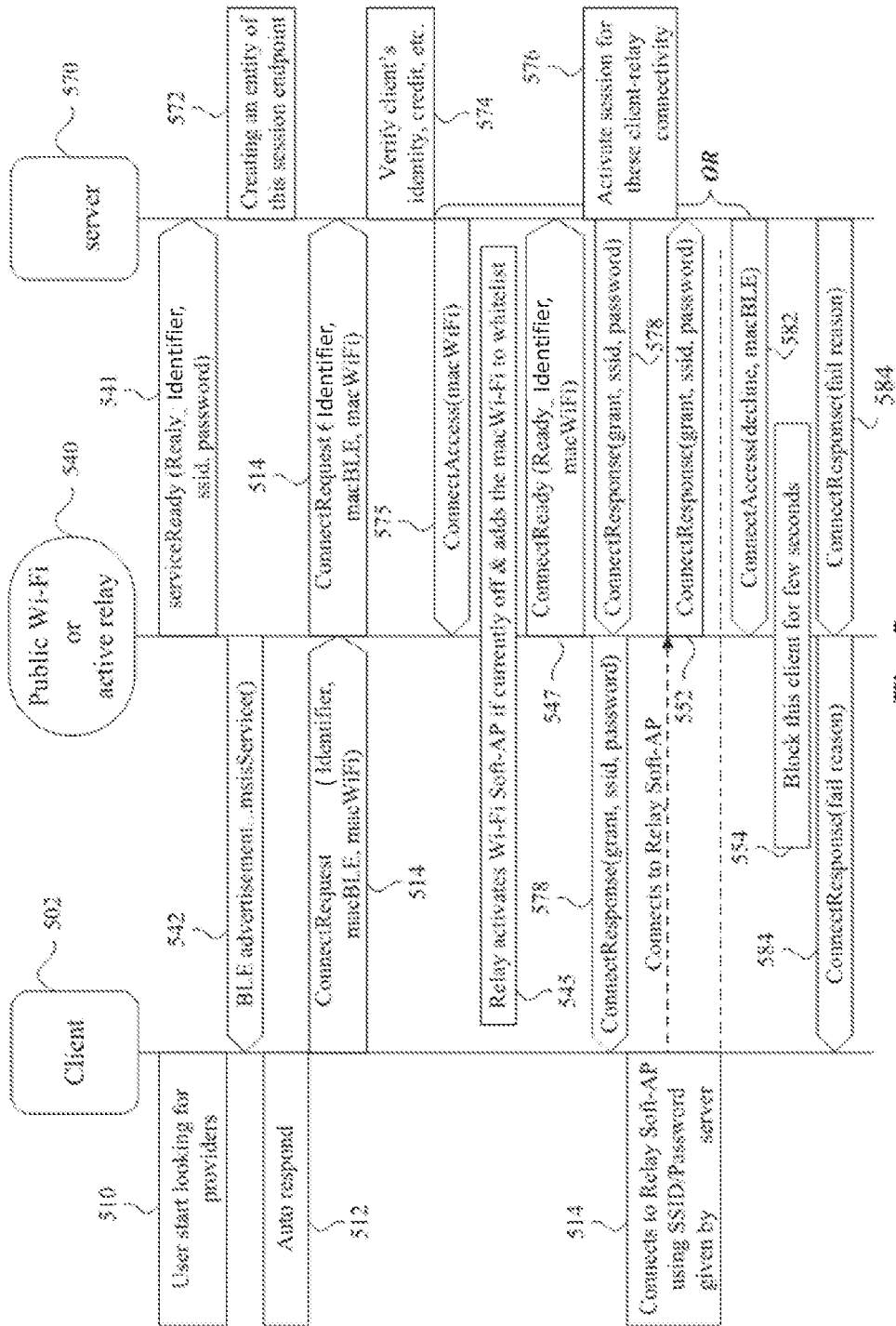
FIG. 5 is a schematic illustration of operations and communications according to an Internet connectivity procedure, in accordance with some demonstrative embodiments

Reference is made to FIG. 5, which schematically illustrates operations and communications according to an Internet connectivity procedure 500, in accordance with some demonstrative embodiments.

In some demonstrative embodiments, as shown in FIG. 5, one or more operations of procedure 500 may be performed by a server 570, a client device 502, and/or a relay device 540. For example, server 170 (FIG. 1) may operate as, perform, a role of, and/or perform one or more functionalities of, server 570; device 102 (FIG. 1) may operate as, perform, a role of, and/or perform one or more functionalities of, client device 502; and/or device 140 (FIG. 1) may operate as, perform, a role of, and/or perform one or more functionalities of, relay device 540.

In some demonstrative embodiments, as indicated by arrow 541, relay device 540 may send an announcement to server 570 that relay device 540 is ready to provide Internet connectivity to one or more client devices. For example, the announcement may include an SSID and password for the Internet connection, e.g., as described above.

In some demonstrative embodiments, the server 570 may create a session (572) for the relay device 540.

In one example, the session may include a session endpoint, relay credentials, an identity of relay device 540, and/or location and/or configuration of relay device 540.

In some demonstrative embodiments, client device 502 may search for relay devices (510), for example, to establish a connection to the Internet via a relay device.

In some demonstrative embodiments, as indicated by arrow 542, relay device 540 may advertize a beacon, e.g., via a BLE network or a NAN network, including an indication of the Internet connection capability of relay device 540.

In some demonstrative embodiments, relay device 540 may advertize the beacon via the BLE network or the NAN network, for example, in an idle or a sharing mode.

In some demonstrative embodiments, the beacon may include the Internet connection capability information of relay 540, for example, including a maximal bandwidth providable by relay device 540, a cost of a data bulk, a mobility type of relay device 540, e.g., stationary or types of movements, and/or an availability of relay device 540.

In one example, the cost of the Data bulk may increase, for example, based on a network load or a free capacity.

In some demonstrative embodiments, relay device 540 may broadcast the beacon, for example, if one or more pattern conditions are met.

In some demonstrative embodiments, the pattern conditions may include a condition with respect to a location of relay device 540, a condition with respect to time of day, a condition with respect to dates, a condition with respect to a quality of service parameter, a battery life of a battery of relay device 540, and/or any other condition with respect to relay device 540.

In some demonstrative embodiments, relay device 540 may be configured to broadcast a secondary SSID having a BLE functionality, e.g., in addition to a first SSID having Wi-Fi functionality, for example, if relay device 540 is a wired device In some demonstrative embodiments, as indicated by block 512, client device 502 may discover device 540 and may select to connect to the Internet via relay device 540.

In some demonstrative embodiments, client device 502 may select to connect to the Internet via relay device 540, for example, based on a relay score of relay device 540, e.g., compared to a threshold score and/or to one or more scores of one or more other detected relay devices.

In some demonstrative embodiments, the relay score may include, for example, a number in a range, e.g., between 1-100. In other embodiments, the relay score may include any other score.

In some demonstrative embodiments, client device 502 may select to connect to the Internet via relay device 540, for example, if relay device 540 has the highest relay score, e.g., compared to other discovered relay devices.

In some demonstrative embodiments, the relay score may be based on one or parameters of the Internet connection capabilities of a relay device, e.g., a maximal bandwidth providable by the relay device, availability of the relay device to provide Internet access, a cost of the data bulk, and/or the mobility type of the relay device. In other embodiments, the relay score may be based on any other parameters and/or criteria.

In some demonstrative embodiments, the relay score of relay device 540 may be based, for example, on a relay function, e.g., as follows:

$$f(A)=n; f:=\{\text{service conditions}\} \rightarrow \{\text{relay score}\}$$

In one example, the relay score may be based on a normalized weighted averaging of the one or more parameters of the Internet connection capabilities of the relay device 540.

In some demonstrative embodiments, as indicated by arrows 514, client device 502 may send a connection request to the server 570, e.g., via relay device 540.

In some demonstrative embodiments, as indicated by block 574, the server 570 may authenticate client device 502.

In some demonstrative embodiments, as indicated by arrow 575, server 570 may send a connect access message to relay device 540, to instruct relay device 540 to share the Internet access of relay device 540 with client device 502.

In some demonstrative embodiments, as indicated by block 545, relay device 540 may activate a Wi-Fi SOFT-AP, e.g., to enable client device 502 connect to the Internet via relay device 540.

In some demonstrative embodiments, as indicated by arrow 547, relay device 540 may inform server 570 that the Wi-Fi SOFT-AP is activated.

In some demonstrative embodiments, as indicated by block 576, server 570 may activate a session corresponding to client device 502 and relay device 540.

In some demonstrative embodiments, as indicated by arrows 578, server 570 may send, via relay device 540, a grant message to client device 502 indicating that client device 502 is allowed to establish the Internet connection via relay device 540.

In some demonstrative embodiments, the grant message may include credentials, e.g., an SSID and a password, to connect to the Wi-Fi SOFT-AP.

In one example, relay device 540 may update a white list of client devices allowed to communicate via the Wi-Fi Soft AP provided by relay device 540, for example, if client device 502 is authenticated and/or verified. The white list may expire, for example, when a session between relay device 540 and client device 502 terminates.

In some demonstrative embodiments, as indicated by block 514, client device 502 may connect to the Wi-Fi SOFT-AP, for example, based on the credentials, e.g., the SSID and the password, provided in the grant message.

In some demonstrative embodiments, as indicated by arrow 552, relay device 540 may inform server 570 that client device 502 is connected to the Internet, e.g., via relay device 540.

In some demonstrative embodiments, relay device 540 may manage a list of connected client devices, e.g., as described below.

In some demonstrative embodiments, a client device entry in the list may include one or more client properties corresponding to the client device, e.g., a domain.

In some demonstrative embodiments, the client properties may include for example, usage frequency of the client, a Received Signal Strength Indicator (RSSI) of the client device, usage rate of the Internet connection utilized by the client device, and/or an agreed cost of data bulk.

In some demonstrative embodiments, relay device 540 may be configured to determine one or more parameters of the Internet connection to be provided to different client devices, e.g., in terms of QoS, bandwidth, and/or an amount of data to be proved.

In some demonstrative embodiments, relay device 540 may be configured to determine the parameters of the Internet connection corresponding to a client device, for example, based on a client score of the client device, e.g., as described below.

In some demonstrative embodiments, the client score may include a number in a range, e.g., between 1-100. In other embodiments, the client score may include any other value in any other range.

In some demonstrative embodiments, the client score of a client may indicate, for example, whether or not the client is a new client or an old client.

In some demonstrative embodiments, the client function may be based on one or more client properties of the client.

The client score may be based, for example, on a score function, e.g., as follows:

$f(A)=n;f=\{\text{client properties}\}\rightarrow\{\text{client score}\}$

In some demonstrative embodiments, as indicated by arrow 582, server 570 may send a connect access message to relay device 540 to instruct relay device 540 to prohibit the Internet access of client device 502 via relay device 540, for example, if client device 502 is not authenticated and/or verified.

In some demonstrative embodiments, as indicated by block 555, relay device 540 may block the client device from connecting to the Wi-Fi SOFT-AP, e.g., to prevent device 502 from connecting to the Internet.

In one example, relay device 540 may update a black list of client devices to include an identifier of client device 502, for example, if client device 502 is not authenticated and/or verified by server 570. The black list may expire, for example, by a timeout.

In some demonstrative embodiments, as indicated by arrows 584, server 570 may send, via relay device 540, a refusal message to client device 502 indicating that client device 502 is not allowed to establish the Internet connection via relay device 540.

In some demonstrative embodiments, client device 502 may perform a handoff procedure to switch between a first relay device and a second relay device, for example, based on a comparison between a first relay score of the first relay device and a second relay score of the second relay device, e.g., as described below.

In some demonstrative embodiments, while client device 502 is connected to the Internet via relay device 540, client device 502 may search for a better relay device, for example, periodically and/or in response to a request from the client, e.g., as described below.

In some demonstrative embodiments, client device 502 may search for the better relay device, for example, using a BLE network or a NAN network.

In some demonstrative embodiments, while client device 502 is connected to the Internet via relay device 540, device 540 may compare a relay score of device 540 and relay scores of other relay devices around client devices 502.

In some demonstrative embodiments, client device 502 may perform a handoff procedure from client device 540 to another client device, for example, if difference between the relay score of device 540 and a relay score of the other relay device is greater that a handoff threshold.

For example, client device 502 may perform the handoff procedure from client device 540 to the other client device, for example, if the relay score of the other relay device is higher than the relay score of relay device 540, e.g., by at least X %.

Figure 6:
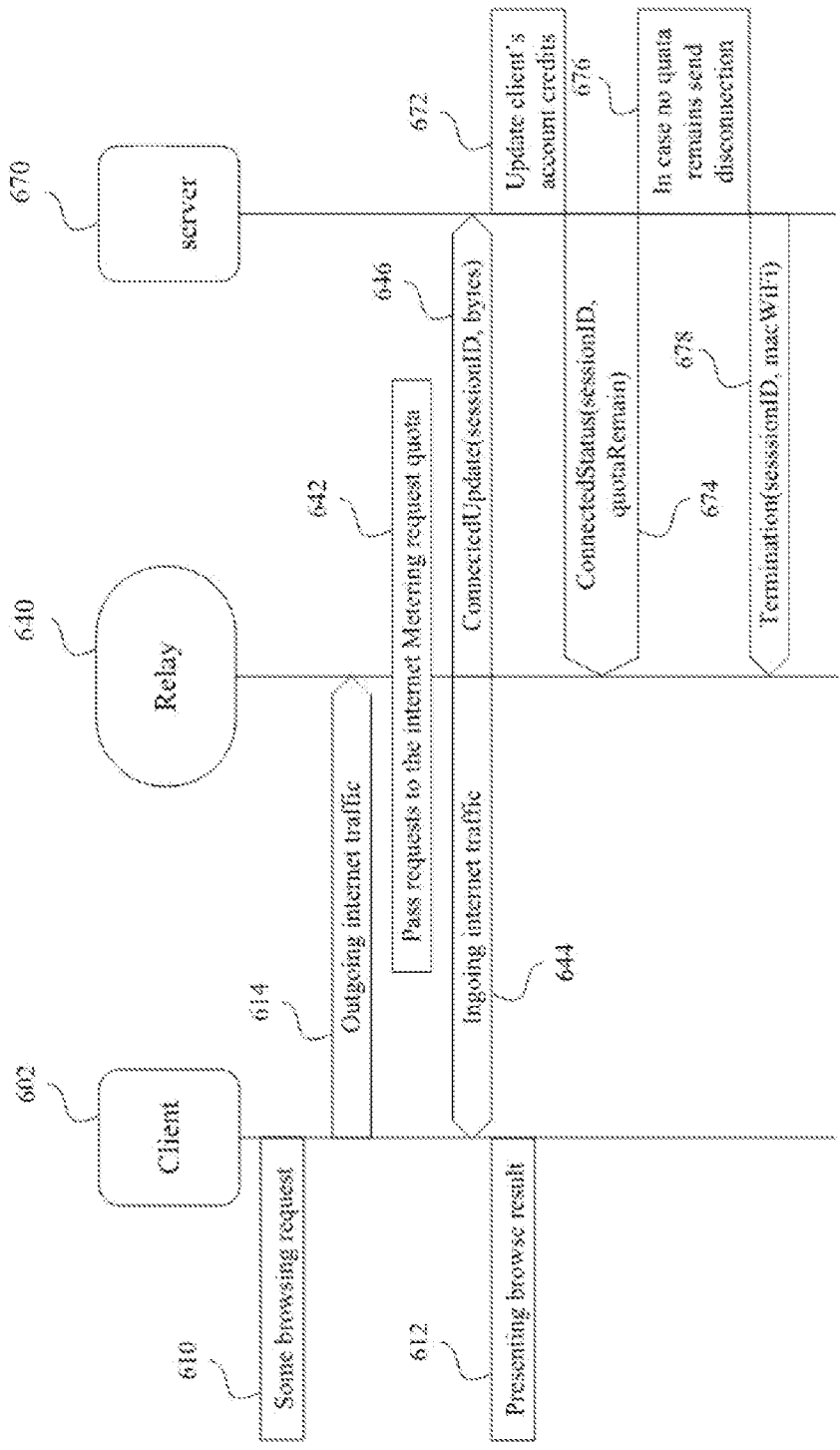
FIG. 6 is a schematic illustration of operations and communications according to a metering procedure, in accordance with some demonstrative embodiments.

Reference is made to FIG. 6, which schematically illustrates operations and communications according to a metering procedure 600, in accordance with some demonstrative embodiments.

In some demonstrative embodiments, as shown in FIG. 6, one or more operations of metering procedure 600 may be performed by a server 670, a client device 602, and/or a relay device 640. For example, server 170 (FIG. 1) may operate as, perform, a role of, and/or perform one or more functionalities of, server 670; device 102 (FIG. 1) may operate as, perform, a role of, and/or perform one or more functionalities of, client device 602; and/or device 140 (FIG. 1) may operate as, perform, a role of, and/or perform one or more functionalities of, relay device 640.

In some demonstrative embodiments, as indicated by block 610, a client using client device 602 may request to browse the Internet.

In some demonstrative embodiments, as indicated by arrow 614, client device 602 may send outgoing Internet traffic to the Internet, e.g., via relay device 640.

In some demonstrative embodiments, as indicated by block 642, relay device 640 may share and meter an Internet connection with client device 602 by providing ingoing internet traffic 644 to client device 602, while sending an update 646 to server 670 to indicate a usage of the client device 602 of the internet connection.

In some demonstrative embodiments, as indicated by block 612, client device 602 may present to the user of client device 602 browsing results, for example, based on the ingoing internet traffic.

In some demonstrative embodiments, as indicated by block 672, server 670 may update the credit balance of the client of client device 602, for example, based on the update 646 from client device 640.

In some demonstrative embodiments, as indicated by arrow 674, server 670 may send a status message to relay device 640, for example, to update a status, e.g., the credit balance, of client device 602.

In some demonstrative embodiments, as indicated by block 676, server 670 may select to send a termination message 678 to relay device 640 to terminate the Internet connection, for example, if the credit balance of client device 602 is below a threshold.

Figure 7:
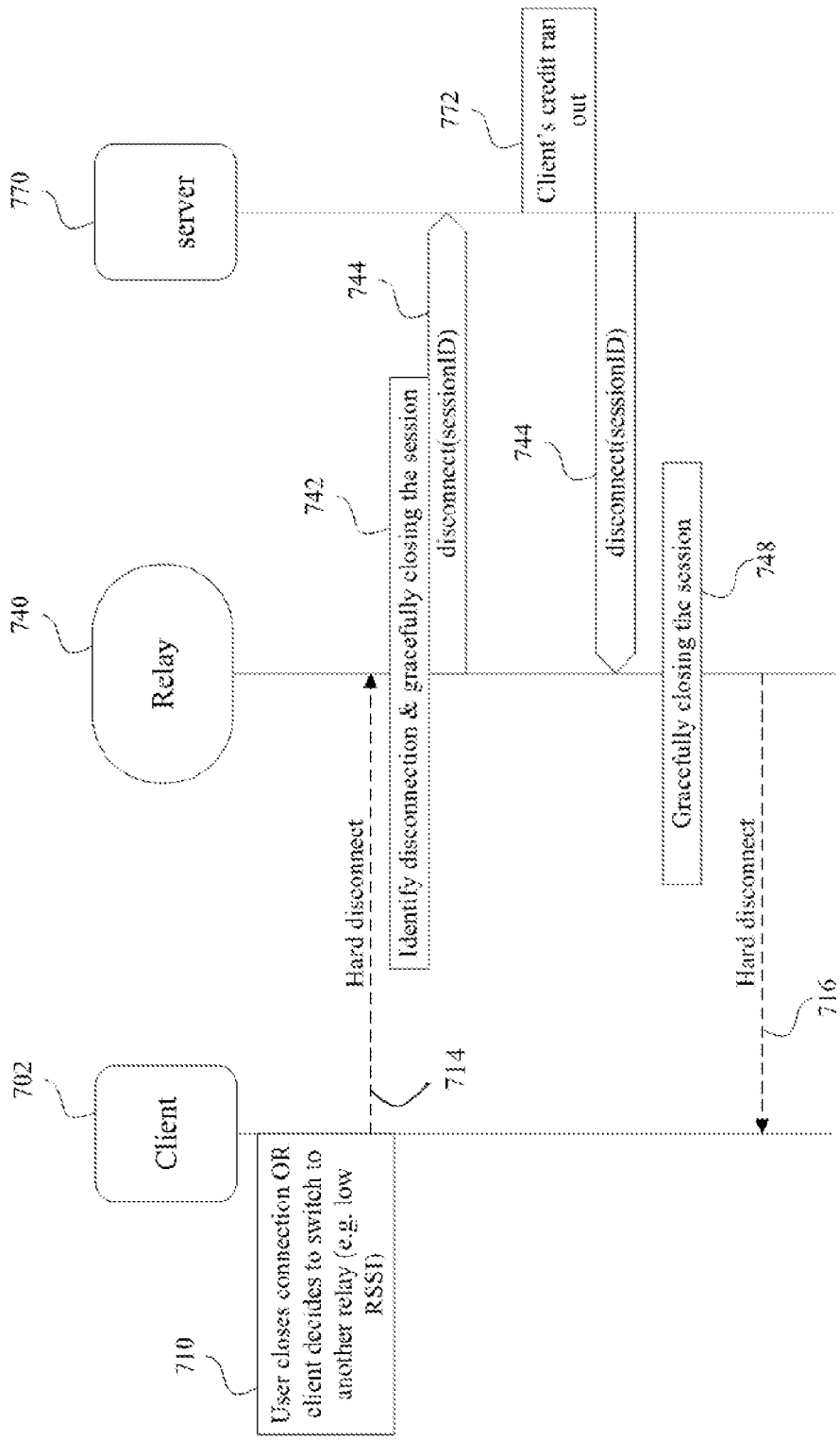
FIG. 7 is a schematic illustration of operations and communications according to a termination procedure, in accordance with some demonstrative embodiments

Reference is made to FIG. 7, which schematically illustrates operations and communications according to a termination procedure 700, in accordance with some demonstrative embodiments.

In some demonstrative embodiments, as shown in FIG. 7, one or more operations of termination procedure 700 may be performed by a server 770, a client device 702, and/or a relay device 740. For example, server 170 (FIG. 1) may operate as, perform, a role of, and/or perform one or more functionalities of, server 770; device 102 (FIG. 1) may operate as, perform, a role of, and/or perform one or more functionalities of, client device 702; and/or device 140 (FIG. 1) may operate as, perform, a role of, and/or perform one or more functionalities of, relay device 740.

In some demonstrative embodiments, as indicated by block 710, a client using client device 702 may request to terminate the Internet connection via relay device 740, for example, if the client is no longer in need of the Internet connection, or if the client finds a better relay device to connect to the Internet.

In some demonstrative embodiments, as indicated by arrow 714, client device 702 may send a termination message to relay device 740.

In some demonstrative embodiments, as indicated by block 742, relay device 740 may terminate the Internet connection.

In some demonstrative embodiments, as indicated by arrow 744, relay device 740 may update server 770 that relay device 740 is to terminate the Internet connection of client device 702.

In some demonstrative embodiments, server 770 may update the relay credit balance, for example, based on a usage of the Internet connection by client device 702.

In some demonstrative embodiments, as indicated by block 772, server 770 may determine to send a termination message 774 to terminate the Internet connection of client device 702 via relay device 740, for example, if the credit balance of client device 702 is below a threshold.

In some demonstrative embodiments, as indicated by block 748, relay device 740 may terminate the Internet connection, for example, based on termination message 774.

In some demonstrative embodiments, as indicated by arrow 716, relay device 740 may send a termination message to client device 702 to update client device 702 that relay device 740 is to terminate the Internet connection of client device 702.

Figure 8:
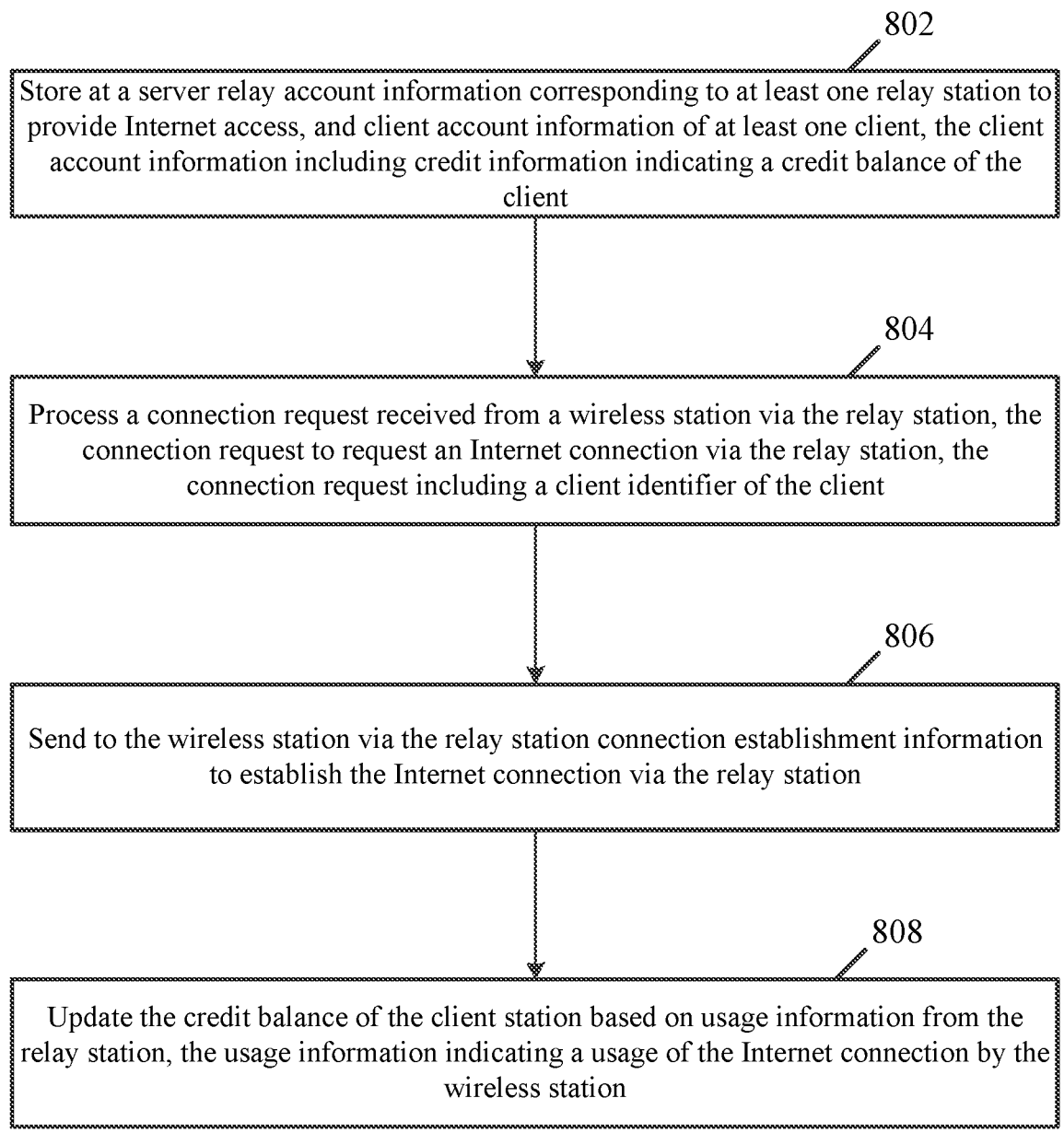
FIG. 8 is a schematic flow-chart illustration of a method of Internet connectivity via a relay station, in accordance with some demonstrative embodiments.

Reference is made to FIG. 8, which schematically illustrates a flow-chart illustration of a method of Internet connectivity via a relay station, in accordance with some demonstrative embodiments. For example, one or more of the operations of the method of FIG. 8 may be performed by one or more elements of a system, system 100 (FIG. 1) and/or system 200 (FIG. 2); a device, e.g., wireless communication devices 102 and/or 140 (FIG. 1); a server, e.g., server 170 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 802, the method may include storing relay account information corresponding to at least one relay station to provide Internet access, and client account information of at least one client, the client account information including credit information indicating a credit balance of the client. For example, server 170 (FIG. 1) may store in DB 178 (FIG. 1) the relay account information corresponding to device 140 (FIG. 1), and the client account information corresponding to device 102 (FIG. 1), e.g., as described above.

As indicated at block 804, the method may include processing a connection request received from a wireless station via the relay station, the connection request to request an Internet connection via the relay station, the connection request including a client identifier of the client. For example, server 170 (FIG. 1) may process a connection request received from device 102 via device 140 (FIG. 1) to request an Internet connection via device 140 (FIG. 1), e.g., as described above.

As indicated at block 806, the method may include sending to the wireless station via the relay station connection establishment information to establish the Internet connection via the relay station. For example, server 170 (FIG. 1) may send to device 102 (FIG. 1) via device 140 (FIG. 1) connection establishment information to establish the Internet connection via device 140 (FIG. 1), e.g., as described above.

As indicated at block 808, the method may include updating the credit balance based on usage information from the relay station, the usage information indicating a usage of the Internet connection by the wireless station. For example, server 170 (FIG. 1) may update the credit balance based on the usage information of device 102 (FIG. 1) from device 140 (FIG. 1), e.g., as described above.

Figure 9:
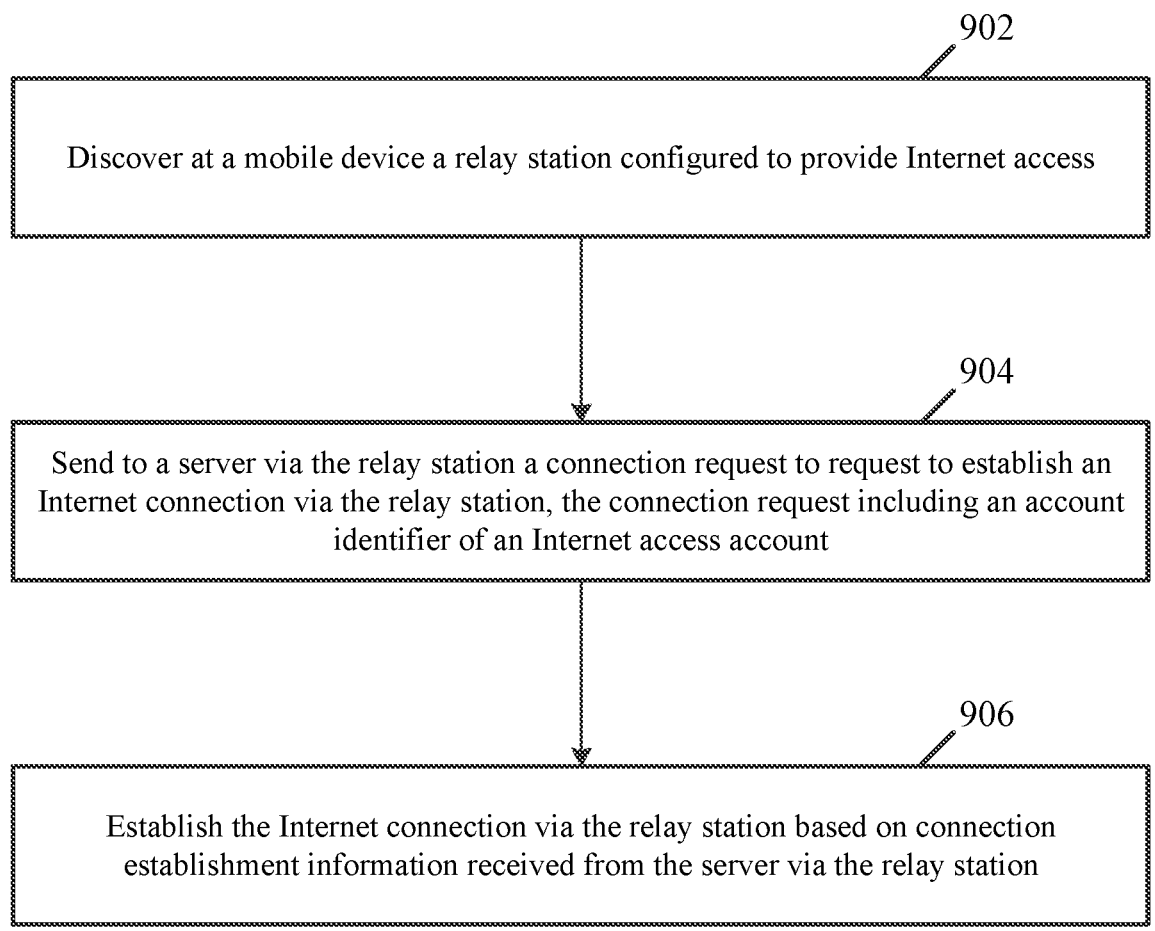
FIG. 9 is a schematic flow-chart illustration of a method of Internet connectivity via a relay station, in accordance with some demonstrative embodiments.

Reference is made to FIG. 9, which schematically illustrates a flow-chart illustration of a method of Internet connectivity via a relay station, in accordance with some demonstrative embodiments. For example, one or more of the operations of the method of FIG. 9 may be performed by one or more elements of a system, system 100 (FIG. 1) and/or system 200 (FIG. 2); a device, e.g., wireless communication devices 102 and/or 140 (FIG. 1); a server, e.g., server 170 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 902, the method may include discovering a relay station configured to provide Internet access. For example, device 102 (FIG. 1) may discover device 140 (FIG. 1) configured to provide Internet access, e.g., as described above.

As indicated at block 904, the method may include sending to a server via the relay station a connection request to request to establish an Internet connection via the relay station, the connection request including an account identifier of an Internet access account. For example, device 102 (FIG. 1) may send the connection request to server 170 (FIG. 1) via device 140 (FIG. 1) to request to establish an Internet connection via device 140 (FIG. 1), e.g., as described above.

As indicated at block 906, the method may include establishing the Internet connection via the relay station based on connection establishment information received from the server via the relay station. For example, device 102 (FIG. 1) may establish the Internet connection via device 140 (FIG. 1) based on connection establishment information received from server 170 (FIG. 1) via device 140 (FIG. 1), e.g., as described above.

Figure 10:
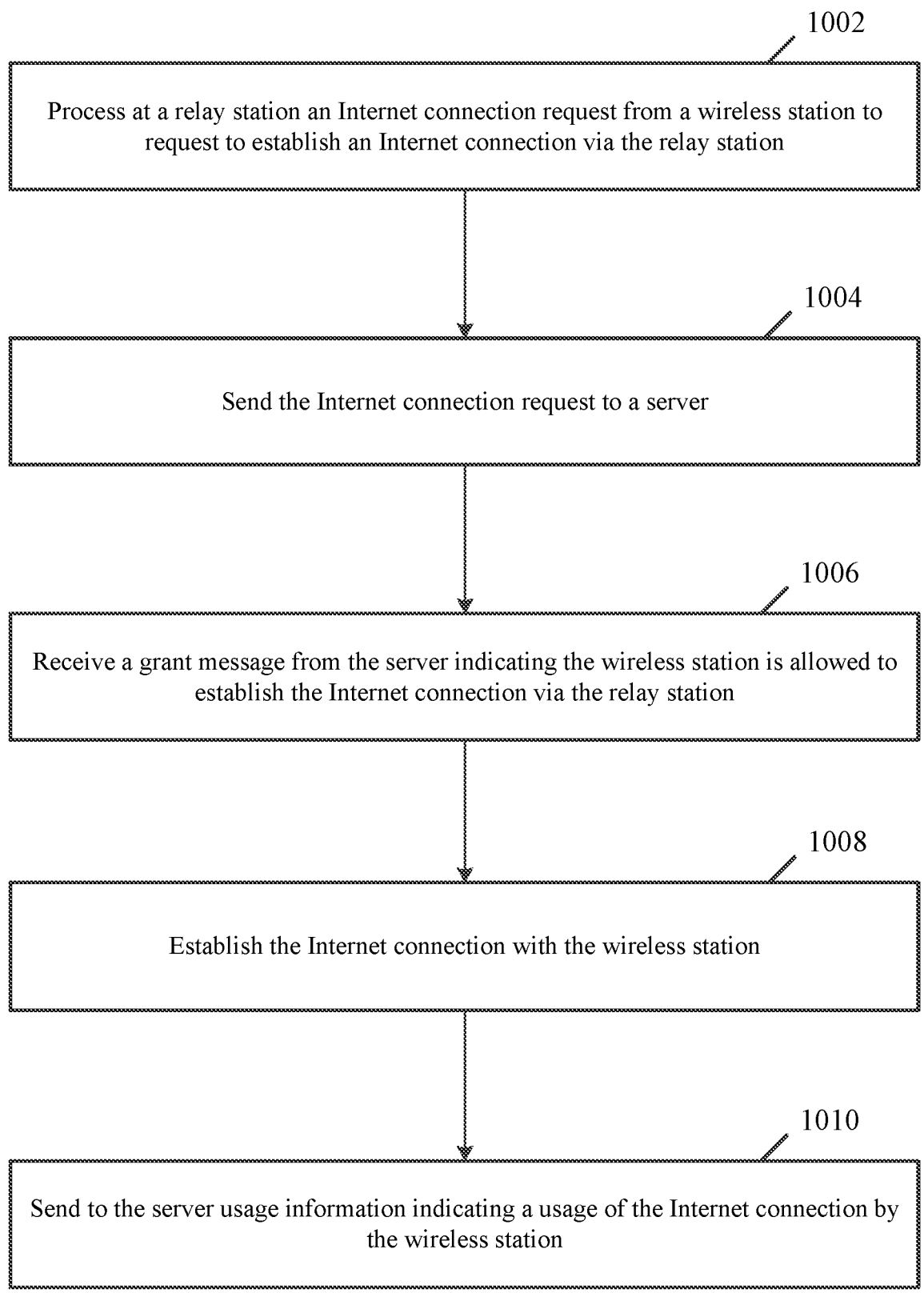
FIG. 10 is a schematic flow-chart illustration of a method of Internet connectivity via a relay station, in accordance with some demonstrative embodiments.

Reference is made to FIG. 10, which schematically illustrates a flow-chart illustration of a method of Internet connectivity via a relay station, in accordance with some demonstrative embodiments. For example, one or more of the operations of the method of FIG. 10 may be performed by one or more elements of a system, system 100 (FIG. 1) and/or system 200 (FIG. 2); a device, e.g., wireless communication devices 102 and/or 140 (FIG. 1); a server, e.g., server 170 (FIG. 1); a controller, e.g., controller 124 (FIG. 1), and/or controller 154 (FIG. 1); a radio, e.g., radio 114 (FIG. 1); and/or radio 144 (FIG. 1); and/or a message processor, e.g., message processor 128 (FIG. 1) and/or message processor 158 (FIG. 1).

As indicated at block 1002, the method may include processing at a relay station an Internet connection request from a wireless station to request to establish an Internet connection via the relay station. For example, device 140 (FIG. 1) may process an Internet connection request from device 102 (FIG. 1) to request to establish an Internet connection via device 140 (FIG. 1), e.g., as described above.

As indicated at block 1004, the method may include sending the Internet connection request to a server. For example, device 140 (FIG. 1) may send the Internet connection request to server 170 (FIG. 1), e.g., as described above.

As indicated at block 1006, the method may include receiving a grant message from the server indicating the wireless station is allowed to establish the Internet connection via the relay station. For example, device 140 (FIG. 1) may receive the grant message from server 170 (FIG. 1) indicating device 102 (FIG. 1) is allowed to establish the Internet connection via device 140 (FIG. 1), e.g., as described above.

As indicated at block 1008, the method may include establishing the Internet connection with the wireless station. For example, device 140 (FIG. 1) may establish the Internet connection with device 102 (FIG. 1), e.g., as described above.

As indicated at block 1010, the method may include sending to the server usage information indicating a usage of the Internet connection by the wireless station. For example, device 140 (FIG. 1) may send to server 170 (FIG. 1) usage information indicating a usage of the Internet connection by device 102 (FIG. 1), e.g., as described above.

Figure 11:
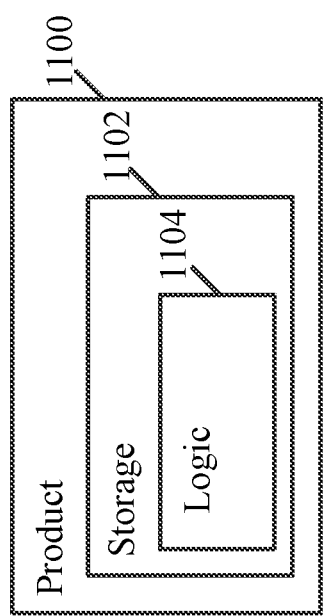
FIG. 11 is a schematic illustration of a product, in accordance with some demonstrative embodiments.

Reference is made to FIG. 11, which schematically illustrates a product of manufacture 1100, in accordance with some demonstrative embodiments. Product 1100 may include one or more tangible computer-readable non-transitory storage media 1102, which may include computer-executable instructions, e.g., implemented by logic 1104, operable to, when executed by at least one computer processor, enable the at least one computer processor to implement one or more operations at device 102, device 140, and/or server 170 (FIG. 1), radio 114 (FIG. 1), transmitter 118 (FIG. 1), receiver 116 (FIG. 1), controller 124, controller 154 (FIG. 1), message processor 128 (FIG. 1), message processor 158 (FIG. 1), and/or to perform, trigger and/or implement one or more operations and/or functionalities described above with respect to one or more of the FIGS. 1-10, and/or one or more operations described herein. The phrase "non-transitory machine-readable medium" is directed to include all computer-readable media, with the sole exception being a transitory propagating signal.

In some demonstrative embodiments, product 1100 and/or machine-readable storage medium 1102 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one computer processor, enable the at least one computer processor to implement operations at a server, the operations comprising storing relay account information corresponding to at least one relay station to provide Internet access, and client account information of at least one client, the client account information comprising credit information indicating a credit balance of the client; processing a connection request received from a wireless station via the relay station, the connection request to request an Internet connection via the relay station, the connection request comprising a client identifier of the client; sending to the wireless station via the relay station connection establishment information to establish the Internet connection via the relay station; and updating the credit balance based on usage information from the relay station, the usage information indicating a usage of the Internet connection by the wireless station.

Example 2 includes the subject matter of Example 1, and optionally, wherein the relay account information comprises relay credit information indicating a relay credit balance of the relay station, the operations comprising increasing the relay credit balance, based on the usage information.

Example 3 includes the subject matter of Example 1 or 2, and optionally, wherein the operations comprise receiving from the client a client registration request, and storing client account information corresponding to the client based on the client registration request.

Example 4 includes the subject matter of any one of Examples 1-3, and optionally, wherein the operations comprise receiving from the client payment information, and updating the credit balance based on the payment information.

Example 5 includes the subject matter of any one of Examples 1-4, and optionally, wherein the operations comprise sending a grant message to the relay station indicating the wireless station is allowed to establish the Internet connection via the relay station.

Example 6 includes the subject matter of any one of Examples 1-5, and optionally, wherein the client account information comprises authentication information corresponding to the client, the operations comprising authenticating the client based on the authentication information and the connection request.

Example 7 includes the subject matter of any one of Examples 1-6, and optionally, wherein the operations comprise sending a termination message to the relay station to terminate the Internet connection, based on at least one criterion corresponding to the credit balance.

Example 8 includes the subject matter of any one of Examples 1-7, and optionally, wherein the client account information comprises data plan information indicating a data plan for the Internet connection, the data plan comprises one or more attributes selected from the group consisting of a time of usage of the Internet connection, an amount of data to be provided, and a quality of service (QoS) to be provided.

Example 9 includes the subject matter of Example 8, and optionally, wherein the operations comprise updating the credit balance based on the data plan.

Example 10 includes the subject matter of any one of Examples 1-9, and optionally, wherein the operations comprise receiving a relay registration request from the relay station and storing relay account information corresponding to the relay station based on the relay registration request, the relay registration request comprising Internet connection capability information comprising an indication of at least one capability selected from the group consisting of a maximal bandwidth providable by the relay station, and availability of the relay station to provide Internet access.

Example 11 includes the subject matter of any one of Examples 1-10, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 12 includes the subject matter of any one of Examples 1-11, and optionally, wherein the connection establishment information comprises a Service Set Identifier (SSID), and a password corresponding to the SSID.

Example 13 includes a server comprising a database to store relay account information corresponding to least one relay station to provide Internet access, and client account information of at least one client, the client account information comprising credit information indicating a credit balance of the client; at least one communication interface to communicate with the at least one relay station; and a processor to process a connection request from a wireless station via the relay station, the connection request to request an Internet connection via the relay station, the connection request comprising a client identifier of the client, the processor is configured to cause the communication interface to send to the wireless station via the relay station connection establishment information to establish the Internet connection via the relay station, the processor is configured to update the credit balance based on usage information from the relay station, the usage information indicating a usage of the Internet connection by the wireless station.

Example 14 includes the subject matter of Example 13, and optionally, wherein the relay account information comprises relay credit information indicating a relay credit balance of the relay station, the server is configured to increase the relay credit balance, based on the usage information.

Example 15 includes the subject matter of Example 13 or 14, and optionally, wherein the server is configured to receive from the client a client registration request, and to store client account information corresponding to the client based on the client registration request.

Example 16 includes the subject matter of any one of Examples 13-15, and optionally, wherein the server is configured to receive from the client payment information, and to update the credit balance based on the payment information.

Example 17 includes the subject matter of any one of Examples 13-16, and optionally, wherein the server is configured to send a grant message to the relay station indicating the wireless station is allowed to establish the Internet connection via the relay station.

Example 18 includes the subject matter of any one of Examples 13-17, and optionally, wherein the client account information comprises authentication information corresponding to the client, the server is configured to authenticate the client based on the authentication information and the connection request.

Example 19 includes the subject matter of any one of Examples 13-18, and optionally, wherein the server is configured to send a termination message to the relay station to terminate the Internet connection, based on at least one criterion corresponding to the credit balance.

Example 20 includes the subject matter of any one of Examples 13-19, and optionally, wherein the client account information comprises data plan information indicating a data plan for the Internet connection, the data plan comprises one or more attributes selected from the group consisting of a time of usage of the Internet connection, an amount of data to be provided, and a quality of service (QoS) to be provided.

Example 21 includes the subject matter of Example 20, and optionally, wherein the server is configured to update the credit balance based on the data plan.

Example 22 includes the subject matter of any one of Examples 13-21, and optionally, wherein the server is configured to receive a relay registration request from the relay station and to store relay account information corresponding to the relay station based on the relay registration request, the relay registration request comprising Internet connection capability information comprising an indication of at least one capability selected from the group consisting of a maximal bandwidth providable by the relay station, and availability of the relay station to provide Internet access.

Example 23 includes the subject matter of any one of Examples 13-22, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 24 includes the subject matter of any one of Examples 13-23, and optionally, wherein the connection establishment information comprises a Service Set Identifier (SSID), and a password corresponding to the SSID.

Example 25 includes a method to be performed at a server, the method comprising storing relay account information corresponding to at least one relay station to provide Internet access, and client account information of at least one client, the client account information comprising credit information indicating a credit balance of the client; processing a connection request received from a wireless station via the relay station, the connection request to request an Internet connection via the relay station, the connection request comprising a client identifier of the client; sending to the wireless station via the relay station connection establishment information to establish the Internet connection via the relay station; and updating the credit balance based on usage information from the relay station, the usage information indicating a usage of the Internet connection by the wireless station.

Example 26 includes the subject matter of Example 25, and optionally, wherein the relay account information comprises relay credit information indicating a relay credit balance of the relay station, the method comprising increasing the relay credit balance, based on the usage information.

Example 27 includes the subject matter of Example 25 or 26, and optionally comprising receiving from the client a client registration request, and storing client account information corresponding to the client based on the client registration request.

Example 28 includes the subject matter of any one of Examples 25-27, and optionally comprising receiving from the client payment information, and updating the credit balance based on the payment information.

Example 29 includes the subject matter of any one of Examples 25-28, and optionally comprising sending a grant message to the relay station indicating the wireless station is allowed to establish the Internet connection via the relay station.

Example 30 includes the subject matter of any one of Examples 25-29, and optionally, wherein the client account information comprises authentication information corresponding to the client, comprising authenticating the client based on the authentication information and the connection request.

Example 31 includes the subject matter of any one of Examples 25-30, and optionally comprising sending a termination message to the relay station to terminate the Internet connection, based on at least one criterion corresponding to the credit balance.

Example 32 includes the subject matter of any one of Examples 25-31, and optionally, wherein the client account information comprises data plan information indicating a data plan for the Internet connection, the data plan comprises one or more attributes selected from the group consisting of a time of usage of the Internet connection, an amount of data to be provided, and a quality of service (QoS) to be provided.

Example 33 includes the subject matter of Example 32, and optionally comprising updating the credit balance based on the data plan.

Example 34 includes the subject matter of any one of Examples 25-33, and optionally comprising receiving a relay registration request from the relay station and storing relay account information corresponding to the relay station based on the relay registration request, the relay registration request comprising Internet connection capability information comprising an indication of at least one capability selected from the group consisting of a maximal bandwidth providable by the relay station, and availability of the relay station to provide Internet access.

Example 35 includes the subject matter of any one of Examples 25-34, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 36 includes the subject matter of any one of Examples 25-35, and optionally, wherein the connection establishment information comprises a Service Set Identifier (SSID), and a password corresponding to the SSID.

Example 37 includes an apparatus of a server, the apparatus comprising means for storing relay account information corresponding to at least one relay station to provide Internet access, and client account information of at least one client, the client account information comprising credit information indicating a credit balance of the client; means for processing a connection request received from a wireless station via the relay station, the connection request to request an Internet connection via the relay station, the connection request comprising a client identifier of the client; means for sending to the wireless station via the relay station connection establishment information to establish the Internet connection via the relay station; and means for updating the credit balance based on usage information from the relay station, the usage information indicating a usage of the Internet connection by the wireless station.

Example 38 includes the subject matter of Example 37, and optionally, wherein the relay account information comprises relay credit information indicating a relay credit balance of the relay station, the apparatus comprising means for increasing the relay credit balance, based on the usage information.

Example 39 includes the subject matter of Example 37 or 38, and optionally comprising means for receiving from the client a client registration request, and storing client account information corresponding to the client based on the client registration request.

Example 40 includes the subject matter of any one of Examples 37-39, and optionally comprising means for receiving from the client payment information, and updating the credit balance based on the payment information.

Example 41 includes the subject matter of any one of Examples 37-40, and optionally comprising means for sending a grant message to the relay station indicating the wireless station is allowed to establish the Internet connection via the relay station.

Example 42 includes the subject matter of any one of Examples 37-41, and optionally, wherein the client account information comprises authentication information corresponding to the client, the apparatus comprising means for authenticating the client based on the authentication information and the connection request.

Example 43 includes the subject matter of any one of Examples 37-42, and optionally comprising means for sending a termination message to the relay station to terminate the Internet connection, based on at least one criterion corresponding to the credit balance.

Example 44 includes the subject matter of any one of Examples 37-43, and optionally, wherein the client account information comprises data plan information indicating a data plan for the Internet connection, the data plan comprises one or more attributes selected from the group consisting of a time of usage of the Internet connection, an amount of data to be provided, and a quality of service (QoS) to be provided.

Example 45 includes the subject matter of Example 44, and optionally comprising means for updating the credit balance based on the data plan.

Example 46 includes the subject matter of any one of Examples 37-45, and optionally comprising means for receiving a relay registration request from the relay station and storing relay account information corresponding to the relay station based on the relay registration request, the relay registration request comprising Internet connection capability information comprising an indication of at least one capability selected from the group consisting of a maximal bandwidth providable by the relay station, and availability of the relay station to provide Internet access.

Example 47 includes the subject matter of any one of Examples 37-46, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 48 includes the subject matter of any one of Examples 37-47, and optionally, wherein the connection establishment information comprises a Service Set Identifier (SSID), and a password corresponding to the SSID.

Example 49 includes a product comprising one or more tangible computer-readable non-transitory storage media comprising computer-executable instructions operable to, when executed by at least one computer processor, enable the at least one computer processor to implement operations at a mobile device, the operations comprising discovering a relay station configured to provide Internet access; sending to a server via the relay station a connection request to request to establish an Internet connection via the relay station, the connection request comprising an account identifier of an Internet access account; and establishing the Internet connection via the relay station based on connection establishment information received from the server via the relay station.

Example 50 includes the subject matter of Example 49, and optionally, wherein the operations comprise sending a client registration request to the server, and receiving the account identifier from the server in response to the client registration request.

Example 51 includes the subject matter of Example 49 or 50, and optionally, wherein the operations comprise processing a beacon frame from the relay station, the beacon frame comprising Internet connection capability information of the relay station, and establishing the Internet connection based on the Internet connection capability information of the relay station.

Example 52 includes the subject matter of Example 51, and optionally, wherein the operations comprise discovering a plurality of relay stations configured to provide Internet access, and selecting the relay station from the plurality of relay stations, based on the Internet connection capability information of the relay station.

Example 53 includes the subject matter of Example 51 or 52, and optionally, wherein the Internet connection capability information of the relay station comprises an indication of at least one capability selected from the group consisting of a maximal bandwidth providable by the relay station, availability of the relay station to provide Internet access, and a mobility status of the relay station.

Example 54 includes the subject matter of any one of Examples 49-53, and optionally, wherein the operations comprise discovering the relay station over a Bluetooth Low Energy (BLE) network or a WiFi aware network, and establishing the Internet connection over a WiFi network.

Example 55 includes the subject matter of any one of Examples 49-54, and optionally, wherein the operations comprise sending payment information to the server to facilitate payment for usage of the Internet connection by the mobile device.

Example 56 includes a mobile device comprising one or more antennas; a radio; at least one processor; and a memory to store instructions, which when executed by the processor, result in discovering a relay station configured to provide Internet access; sending to a server via the relay station a connection request to request to establish an Internet connection via the relay station, the connection request comprising an account identifier of an Internet access account; and establishing the Internet connection via the relay station based on connection establishment information received from the server via the relay station.

Example 57 includes the subject matter of Example 56, and optionally, wherein the instructions result in sending a client registration request to the server, and receiving the account identifier from the server in response to the client registration request.

Example 58 includes the subject matter of Example 56 or 57, and optionally, wherein the instructions result in processing a beacon frame from the relay station, the beacon frame comprising Internet connection capability information of the relay station, and establishing the Internet connection based on the Internet connection capability information of the relay station.

Example 59 includes the subject matter of Example 58, and optionally, wherein the instructions result in discovering a plurality of relay stations configured to provide Internet access, and selecting the relay station from the plurality of relay stations, based on the Internet connection capability information of the relay station.

Example 60 includes the subject matter of Example 58 or 59, and optionally, wherein the Internet connection capability information of the relay station comprises an indication of at least one capability selected from the group consisting of a maximal bandwidth providable by the relay station, availability of the relay station to provide Internet access, and a mobility status of the relay station.

Example 61 includes the subject matter of any one of Examples 56-60, and optionally, wherein the instructions result in discovering the relay station over a Bluetooth Low Energy (BLE) network or a WiFi aware network, and establishing the Internet connection over a WiFi network.

Example 62 includes the subject matter of any one of Examples 56-61, and optionally, wherein the instructions result in sending payment information to the server to facilitate payment for usage of the Internet connection by the mobile device.

Example 63 includes a method to be performed at a mobile device, the method comprising discovering a relay station configured to provide Internet access; sending to a server via the relay station a connection request to request to establish an Internet connection via the relay station, the connection request comprising an account identifier of an Internet access account; and establishing the Internet connection via the relay station based on connection establishment information received from the server via the relay station.

Example 64 includes the subject matter of Example 63, and optionally comprising sending a client registration request to the server, and receiving the account identifier from the server in response to the client registration request.

Example 65 includes the subject matter of Example 63 or 64, and optionally comprising processing a beacon frame from the relay station, the beacon frame comprising Internet connection capability information of the relay station, and establishing the Internet connection based on the Internet connection capability information of the relay station.

Example 66 includes the subject matter of Example 65, and optionally comprising discovering a plurality of relay stations configured to provide Internet access, and selecting the relay station from the plurality of relay stations, based on the Internet connection capability information of the relay station.

Example 67 includes the subject matter of Example 65 or 66, and optionally, wherein the Internet connection capability information of the relay station comprises an indication of at least one capability selected from the group consisting of a maximal bandwidth providable by the relay station, availability of the relay station to provide Internet access, and a mobility status of the relay station.

Example 68 includes the subject matter of any one of Examples 63-67, and optionally comprising discovering the relay station over a Bluetooth Low Energy (BLE) network or a WiFi aware network, and establishing the Internet connection over a WiFi network.

Example 69 includes the subject matter of any one of Examples 63-68, and optionally comprising sending payment information to the server to facilitate payment for usage of the Internet connection by the mobile device.

Example 70 includes an apparatus of a mobile device, the apparatus comprising means for discovering a relay station configured to provide Internet access; means for sending to a server via the relay station a connection request to request to establish an Internet connection via the relay station, the connection request comprising an account identifier of an Internet access account; and means for establishing the Internet connection via the relay station based on connection establishment information received from the server via the relay station.

Example 71 includes the subject matter of Example 70, and optionally comprising means for sending a client registration request to the server, and receiving the account identifier from the server in response to the client registration request.

Example 72 includes the subject matter of Example 70 or 71, and optionally comprising means for processing a beacon frame from the relay station, the beacon frame comprising Internet connection capability information of the relay station, and establishing the Internet connection based on the Internet connection capability information of the relay station.

Example 73 includes the subject matter of Example 72, and optionally comprising means for discovering a plurality of relay stations configured to provide Internet access, and selecting the relay station from the plurality of relay stations, based on the Internet connection capability information of the relay station.

Example 74 includes the subject matter of Example 72 or 73, and optionally, wherein the Internet connection capability information of the relay station comprises an indication of at least one capability selected from the group consisting of a maximal bandwidth providable by the relay station, availability of the relay station to provide Internet access, and a mobility status of the relay station.

Example 75 includes the subject matter of any one of Examples 70-74, and optionally comprising means for discovering the relay station over a Bluetooth Low Energy (BLE) network or a WiFi aware network, and establishing the Internet connection over a WiFi network.

Example 76 includes the subject matter of any one of Examples 70-75, and optionally comprising means for sending payment information to the server to facilitate payment for usage of the Internet connection by the mobile device.

Example 77 includes a product comprising one or more tangible computer-readable non-transitory storage media comprising computer-executable instructions operable to, when executed by at least one computer processor, enable the at least one computer processor to implement operations at a relay station, the operations comprising processing an Internet connection request from a wireless station to request to establish an Internet connection via the relay station; sending the Internet connection request to a server; receiving a grant message from the server indicating the wireless station is allowed to establish the Internet connection via the relay station; establishing the Internet connection with the wireless station; and sending to the server usage information indicating a usage of the Internet connection by the wireless station.

Example 78 includes the subject matter of Example 77, and optionally, wherein the operations comprise sending a relay registration request to the server, the relay registration request comprising Internet connection capability information comprising an indication of at least one capability selected from the group consisting of a maximal bandwidth providable by the relay station, and availability of the relay station to provide Internet access.

Example 79 includes the subject matter of Example 77 or 78, and optionally, wherein the operations comprise transmitting a beacon frame comprising Internet connection capability information of the relay station, the Internet connection capability information comprising an indication of at least one capability selected from the group consisting of a maximal bandwidth providable by the relay station, availability of the relay station to provide Internet access, and a mobility status of the relay station.

Example 80 includes the subject matter of any one of Examples 77-79, and optionally, wherein the operations comprise sending to the server payment account information to facilitate payment for the usage of the Internet connection by the wireless station.

Example 81 includes the subject matter of any one of Examples 77-80, and optionally, wherein the operations comprise terminating the Internet connection based on a termination message from the server.

Example 82 includes the subject matter of any one of Examples 77-81, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 83 includes the subject matter of any one of Examples 77-82, and optionally, wherein the operations comprise receiving the Internet connection request over a Bluetooth Low Energy (BLE) network or a WiFi aware network, and establishing the Internet connection over a WiFi network.

Example 84 includes a relay station comprising one or more antennas; a radio; at least one processor; and a memory to store instructions, which when executed by the processor, result in processing an Internet connection request from a wireless station to request to establish an Internet connection via the relay station; sending the Internet connection request to a server; receiving a grant message from the server indicating the wireless station is allowed to establish the Internet connection via the relay station; establishing the Internet connection with the wireless station; and sending to the server usage information indicating a usage of the Internet connection by the wireless station.

Example 85 includes the subject matter of Example 84, and optionally, wherein the instructions result in sending a relay registration request to the server, the relay registration request comprising Internet connection capability information comprising an indication of at least one capability selected from the group consisting of a maximal bandwidth providable by the relay station, and availability of the relay station to provide Internet access.

Example 86 includes the subject matter of Example 84 or 85, and optionally, wherein the instructions result in transmitting a beacon frame comprising Internet connection capability information of the relay station, the Internet connection capability information comprising an indication of at least one capability selected from the group consisting of a maximal bandwidth providable by the relay station, availability of the relay station to provide Internet access, and a mobility status of the relay station.

Example 87 includes the subject matter of any one of Examples 84-86, and optionally, wherein the instructions result in sending to the server payment account information to facilitate payment for the usage of the Internet connection by the wireless station.

Example 88 includes the subject matter of any one of Examples 84-87, and optionally, wherein the instructions result in terminating the Internet connection based on a termination message from the server.

Example 89 includes the subject matter of any one of Examples 84-88, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 90 includes the subject matter of any one of Examples 84-89, and optionally, wherein the instructions result in receiving the Internet connection request over a Bluetooth Low Energy (BLE) network or a WiFi aware network, and establishing the Internet connection over a WiFi network.

Example 91 includes a method to be performed at a relay station, the method comprising processing an Internet connection request from a wireless station to request to establish an Internet connection via the relay station; sending the Internet connection request to a server; receiving a grant message from the server indicating the wireless station is allowed to establish the Internet connection via the relay station; establishing the Internet connection with the wireless station; and sending to the server usage information indicating a usage of the Internet connection by the wireless station.

Example 92 includes the subject matter of Example 91, and optionally comprising sending a relay registration request to the server, the relay registration request comprising Internet connection capability information comprising an indication of at least one capability selected from the group consisting of a maximal bandwidth providable by the relay station, and availability of the relay station to provide Internet access.

Example 93 includes the subject matter of Example 91 or 92, and optionally comprising transmitting a beacon frame comprising Internet connection capability information of the relay station, the Internet connection capability information comprising an indication of at least one capability selected from the group consisting of a maximal bandwidth providable by the relay station, availability of the relay station to provide Internet access, and a mobility status of the relay station.

Example 94 includes the subject matter of any one of Examples 91-93, and optionally comprising sending to the server payment account information to facilitate payment for the usage of the Internet connection by the wireless station.

Example 95 includes the subject matter of any one of Examples 91-94, and optionally comprising terminating the Internet connection based on a termination message from the server.

Example 96 includes the subject matter of any one of Examples 91-95, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 97 includes the subject matter of any one of Examples 91-96, and optionally comprising receiving the Internet connection request over a Bluetooth Low Energy (BLE) network or a WiFi aware network, and establishing the Internet connection over a WiFi network.

Example 98 includes an apparatus of a relay station, the apparatus comprising means for processing an Internet connection request from a wireless station to request to establish an Internet connection via the relay station; means for sending the Internet connection request to a server; means for receiving a grant message from the server indicating the wireless station is allowed to establish the Internet connection via the relay station; means for establishing the Internet connection with the wireless station; and means for sending to the server usage information indicating a usage of the Internet connection by the wireless station.

Example 99 includes the subject matter of Example 98, and optionally comprising means for sending a relay registration request to the server, the relay registration request comprising Internet connection capability information comprising an indication of at least one capability selected from the group consisting of a maximal bandwidth providable by the relay station, and availability of the relay station to provide Internet access.

Example 100 includes the subject matter of Example 98 or 99, and optionally comprising means for transmitting a beacon frame comprising Internet connection capability information of the relay station, the Internet connection capability information comprising an indication of at least one capability selected from the group consisting of a maximal bandwidth providable by the relay station, availability of the relay station to provide Internet access, and a mobility status of the relay station.

Example 101 includes the subject matter of any one of Examples 98-100, and optionally comprising means for sending to the server payment account information to facilitate payment for the usage of the Internet connection by the wireless station.

Example 102 includes the subject matter of any one of Examples 98-101, and optionally comprising means for terminating the Internet connection based on a termination message from the server.

Example 103 includes the subject matter of any one of Examples 98-102, and optionally, wherein the usage information comprises one or more information elements selected from a group consisting of time information corresponding to a usage time of the Internet connection, bandwidth usage information corresponding to a bandwidth of the Internet connection, and data usage information corresponding to data usage of the Internet connection.

Example 104 includes the subject matter of any one of Examples 98-103, and optionally comprising means for receiving the Internet connection request over a Bluetooth Low Energy (BLE) network or a WiFi aware network, and establishing the Internet connection over a WiFi network.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A server comprising:
    a database to store relay account information corresponding to an account associated with a relay station to provide Internet access, and client account information corresponding to an account associated with a client, the client account information comprising credit information indicating a credit balance of the client;
    at least one communication interface to communicate with the relay station; and
    a processor coupled to the at least one communication interface and the database, wherein the processor is configured to:
        process a connection request from a wireless station used by the client via the relay station, wherein the wireless station and the relay station are peer-to-peer devices, and the connection request is to request an Internet connection via the relay station, the connection request comprising a client identifier of the client,
        cause the at least one communication interface to send to the wireless station via the relay station connection establishment information to establish the Internet connection via the relay station, and
        update the credit balance of the client based on usage information collected by the relay station metering a usage of the Internet connection by the wireless station.

2. The server of claim 1, wherein the relay account information comprises relay credit information indicating a relay credit balance of the relay station, and the server is configured to increase the relay credit balance, based on the usage information.

3. The server of claim 1, wherein the processor is configured to receive a client registration request from the client, and to store the client account information corresponding to the client based on the client registration request.

4. The server of claim 1, wherein the processor is configured to send a grant message to the relay station indicating the wireless station is allowed to establish the Internet connection via the relay station.

5. The server of claim 1, wherein the client account information comprises authentication information corresponding to the client, and the server is configured to authenticate the client based on the authentication information and the connection request.

6. The server of claim 1, wherein the processor is configured to send a termination message to the relay station to terminate the Internet connection, based on at least one criterion corresponding to the credit balance of the client.

7. The server of claim 1, wherein the client account information comprises data plan information indicating a data plan for the Internet connection, and the data plan comprises one or more attributes selected from a time of usage of the Internet connection, an amount of data to be provided, or a quality of service (QoS) to be provided.

8. The server of claim 7, wherein the processor is configured to update the credit balance of the client based on the data plan.

9. The server of claim 1, wherein the processor is configured to receive a relay registration request from the relay station, and to store the relay account information corresponding to the relay station based on the relay registration request, the relay registration request comprising Internet connection capability information comprising an indication of at least one capability selected from a maximal bandwidth providable by the relay station, or availability of the relay station to provide the Internet access.

10. The server of claim 1, wherein the usage information comprises one or more information elements selected from time information corresponding to a usage time of the Internet connection, bandwidth usage information corresponding to a bandwidth of the Internet connection, or data usage information corresponding to data usage of the Internet connection.

11. The server of claim 1, wherein the connection establishment information comprises a Service Set Identifier (SSID), and a password corresponding to the SSID.

12. A product comprising one or more tangible computer-readable non-transitory storage media comprising computer-executable instructions operable to, when executed by at least one computer processor, enable the at least one computer processor to implement operations at a mobile device, the operations comprising:
    discovering a relay station configured to provide Internet access, wherein the mobile device and the relay station are peer-to-peer devices;
    sending, to a server via the relay station, a connection request to request to establish an Internet connection via the relay station, the connection request comprising an account identifier of an Internet access account; and
    establishing the Internet connection via the relay station based on connection establishment information received from the server via the relay station, wherein the relay station meters a usage of the Internet connection by the mobile device.

13. The product of claim 12, wherein the operations further comprise sending a client registration request to the server, and receiving the account identifier from the server in response to the client registration request.

14. The product of claim 12, wherein the operations further comprise processing a beacon frame from the relay station, the beacon frame comprising Internet connection capability information of the relay station, and establishing the Internet connection based on the Internet connection capability information of the relay station.

15. The product of claim 14, wherein the operations further comprise discovering a plurality of relay stations configured to provide Internet access, and selecting the relay station from the plurality of relay stations, based on the Internet connection capability information of the relay station.

16. The product of claim 14, wherein the Internet connection capability information of the relay station comprises an indication of at least one capability selected from a maximal bandwidth providable by the relay station, availability of the relay station to provide the Internet access, or a mobility status of the relay station.

17. The product of claim 12, wherein the operations comprise sending payment information to the server to facilitate payment for the usage of the Internet connection by the mobile device.

18. A product comprising one or more tangible computer-readable non-transitory storage media comprising computer-executable instructions operable to, when executed by at least one computer processor, enable the at least one computer processor to implement operations at a relay station, the operations comprising:
processing an Internet connection request from a wireless station to request to establish an Internet connection via the relay station, wherein the wireless station and the relay station are peer-to-peer devices;
sending the Internet connection request to a server;
receiving a grant message from the server indicating the wireless station is allowed to establish the Internet connection via the relay station;
establishing the Internet connection with the wireless station;
metering a usage of the Internet connection by the wireless station to collect usage information, the usage information indicating the usage of the Internet connection by the wireless station; and
sending to the server the usage information.

19. The product of claim 18, wherein the operations further comprise sending a relay registration request to the server, the relay registration request comprising Internet connection capability information comprising an indication of at least one capability selected from a maximal bandwidth providable by the relay station, or availability of the relay station to provide Internet access.

20. The product of claim 18, wherein the operations further comprise transmitting a beacon frame comprising Internet connection capability information of the relay station, the Internet connection capability information comprising an indication of at least one capability selected from a maximal bandwidth providable by the relay station, availability of the relay station to provide Internet access, or a mobility status of the relay station.

21. The product of claim 18, wherein the operations further comprise terminating the Internet connection based on a termination message from the server.

22. The product of claim 18, wherein the usage information comprises one or more information elements selected from time information corresponding to a usage time of the Internet connection, bandwidth usage information corresponding to a bandwidth of the Internet connection, or data usage information corresponding to the data usage of the Internet connection.

23. The product of claim 18, wherein the operations further comprise receiving the Internet connection request over a Bluetooth Low Energy (BLE) network or a WiFi aware network, and establishing the Internet connection over a WiFi network.

24. A relay station comprising: one or more antennas;
a radio;
at least one processor; and
a memory to store instructions, which when executed by the at least one processor, result in:
processing an Internet connection request from a wireless station to request to establish an Internet connection via the relay station, wherein the wireless station and the relay station are peer-to-peer devices;
sending the Internet connection request to a server;
receiving a grant message from the server indicating the wireless station is allowed to establish the Internet connection via the relay station;
establishing the Internet connection with the wireless station;
metering a usage of the Internet connection by the wireless station to collect usage information, the usage information indicating the usage of the Internet connection by the wireless station; and
sending the usage information to the server.

25. The relay station of claim 24, wherein the instructions result in transmitting a beacon frame comprising Internet connection capability information of the relay station, the Internet connection capability information comprising an indication of at least one capability selected from a maximal bandwidth providable by the relay station, availability of the relay station to provide Internet access, or a mobility status of the relay station.

* * * * *